US005550311A

United States Patent [19]

Young

[11] Patent Number: 5,550,311
[45] Date of Patent: Aug. 27, 1996

[54] METHOD AND APPARATUS FOR THERMAL DECOMPOSITION AND SEPARATION OF COMPONENTS WITHIN AN AQUEOUS STREAM

[75] Inventor: Robert Young, Snohomish, Wash.

[73] Assignee: HPR Corporation, Snohomish, Wash.

[21] Appl. No.: 388,067

[22] Filed: Feb. 10, 1995

[51] Int. Cl.$^6$ .................. G21F 9/00; F23G 5/04
[52] U.S. Cl. .................. 588/19; 588/20; 588/200; 588/209; 588/213; 588/228; 110/237; 110/346
[58] Field of Search .................. 588/20, 19, 228, 588/200, 209, 210, 213, 227; 110/237, 346

[56] References Cited

U.S. PATENT DOCUMENTS

| | | | |
|---|---|---|---|
| 132,265 | 10/1872 | Eames et al. | |
| 1,046,683 | 12/1912 | Turner. | |
| 3,616,768 | 11/1971 | Southwick | 110/8 E |
| 3,722,433 | 3/1973 | Kramer | 110/8 R |
| 3,734,035 | 5/1973 | Whitfield | 110/7 R |
| 3,748,081 | 7/1973 | Hummell | 431/7 |
| 3,881,430 | 5/1975 | Katz | 110/8 F |
| 3,918,374 | 11/1975 | Yamamoto et al. | 110/8 E |
| 3,933,434 | 1/1976 | Matovich | 23/252 R |
| 4,036,181 | 7/1977 | Matovich | 123/3 |
| 4,053,432 | 10/1977 | Tiepel et al. | 252/301.1 W |
| 4,056,602 | 11/1977 | Matovich | 423/345 |
| 4,057,396 | 11/1977 | Matovich | 23/252 R |
| 4,059,416 | 11/1977 | Matovich | 48/197 R |
| 4,132,180 | 1/1979 | Fredrick | 110/244 |
| 4,179,263 | 12/1979 | Jung et al. | 432/1 |
| 4,182,246 | 1/1980 | Lombana et al. | 110/188 |
| 4,235,738 | 11/1980 | Knotik et al. | 252/301.1 W |
| 4,279,208 | 7/1981 | Guillaume et al. | 110/346 |
| 4,398,475 | 8/1983 | McKiel, Jr. | 110/346 |
| 4,474,121 | 10/1984 | Lewis | 110/346 |
| 4,499,833 | 2/1985 | Grantham | 110/342 |
| 4,636,335 | 1/1987 | Kawamura et al. | 252/629 |
| 4,646,660 | 3/1987 | Bjorkman et al. | 110/210 |
| 4,654,172 | 3/1987 | Matsuda et al. | 252/629 |
| 4,688,495 | 8/1987 | Galloway | 110/250 |
| 4,874,587 | 10/1989 | Galloway | 422/189 |
| 5,088,856 | 2/1992 | Yocum | 405/128 |
| 5,269,235 | 12/1993 | McGill et al. | 110/246 |

FOREIGN PATENT DOCUMENTS

| | | | |
|---|---|---|---|
| WO90/01367 | 2/1990 | WIPO | B01J 1/00 |
| WO94/20149 | 9/1994 | WIPO | A61L 2/00 |

OTHER PUBLICATIONS

Freeman et al., "Thermal Destruction of Hazardous Waste—A State-of-the-Art Review," *Journal of Hazardous Materials* 14: 103–117, 1987.

*Primary Examiner*—Ngoclan Mai
*Attorney, Agent, or Firm*—Seed and Berry LLP

[57] ABSTRACT

An apparatus and method for treating materials that present disposal problems is provided. The treatment takes place within an aqueous stream and in an oxygen-deficient multiple zone system, and results in the thermal decomposition and/or separation of components within the treated material. The apparatus and method of this invention may be used for the treatment of non-hazardous and hazardous waste, including organic and inorganic compounds, radioactive materials, toxic compounds, binary chemicals (such as nerve gas) and heavy metals, prior to disposal.

53 Claims, 22 Drawing Sheets

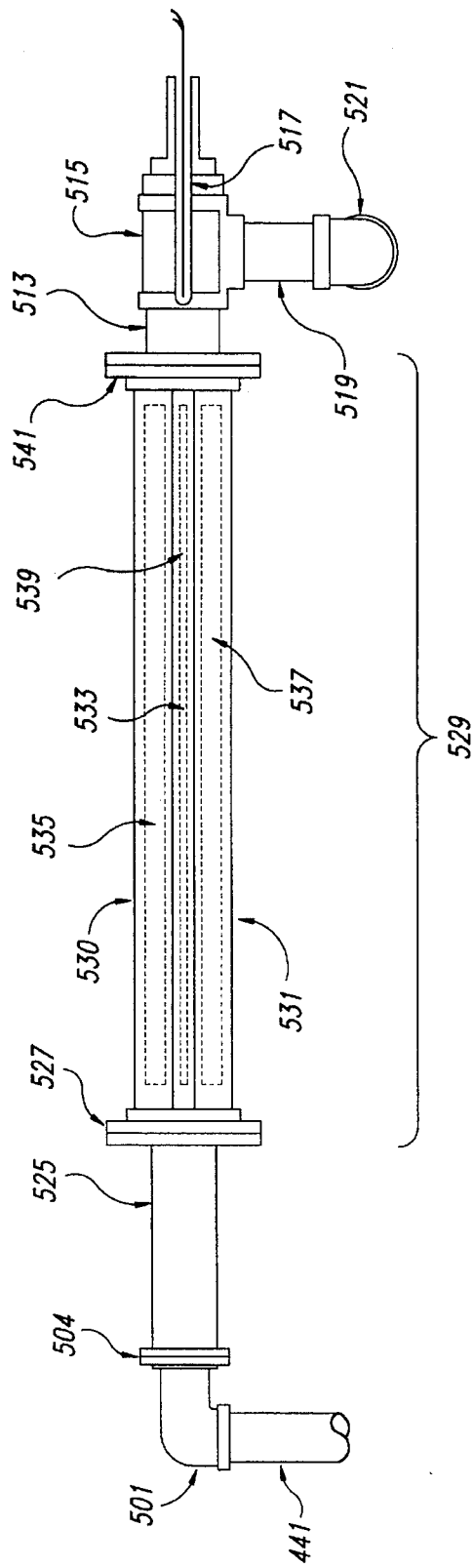
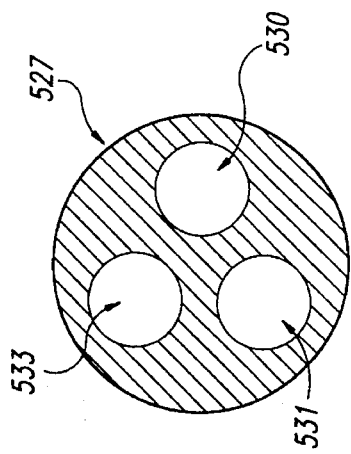
Fig. 7B
Fig. 7C

LEGEND

= RUPTURE DISK

= CHEM SEAL

= TRAP

= ORIFICE PLATE

= AIR VENT

= EXPANSION JOINT

PFL = PROCESS FLUID LIQUID
PFG = PROCESS FLUID GAS
PFHG = PROCESS FLUID HOT GAS
MW = MAKE-UP WATER
PCW = PROCESS WATER
DR = DRAIN/OVERFLOW
ST150 = 150 PSI STEAM
C5 = 5 PSI CONDENSATE
C150 = 150 PSI CONDENSATE

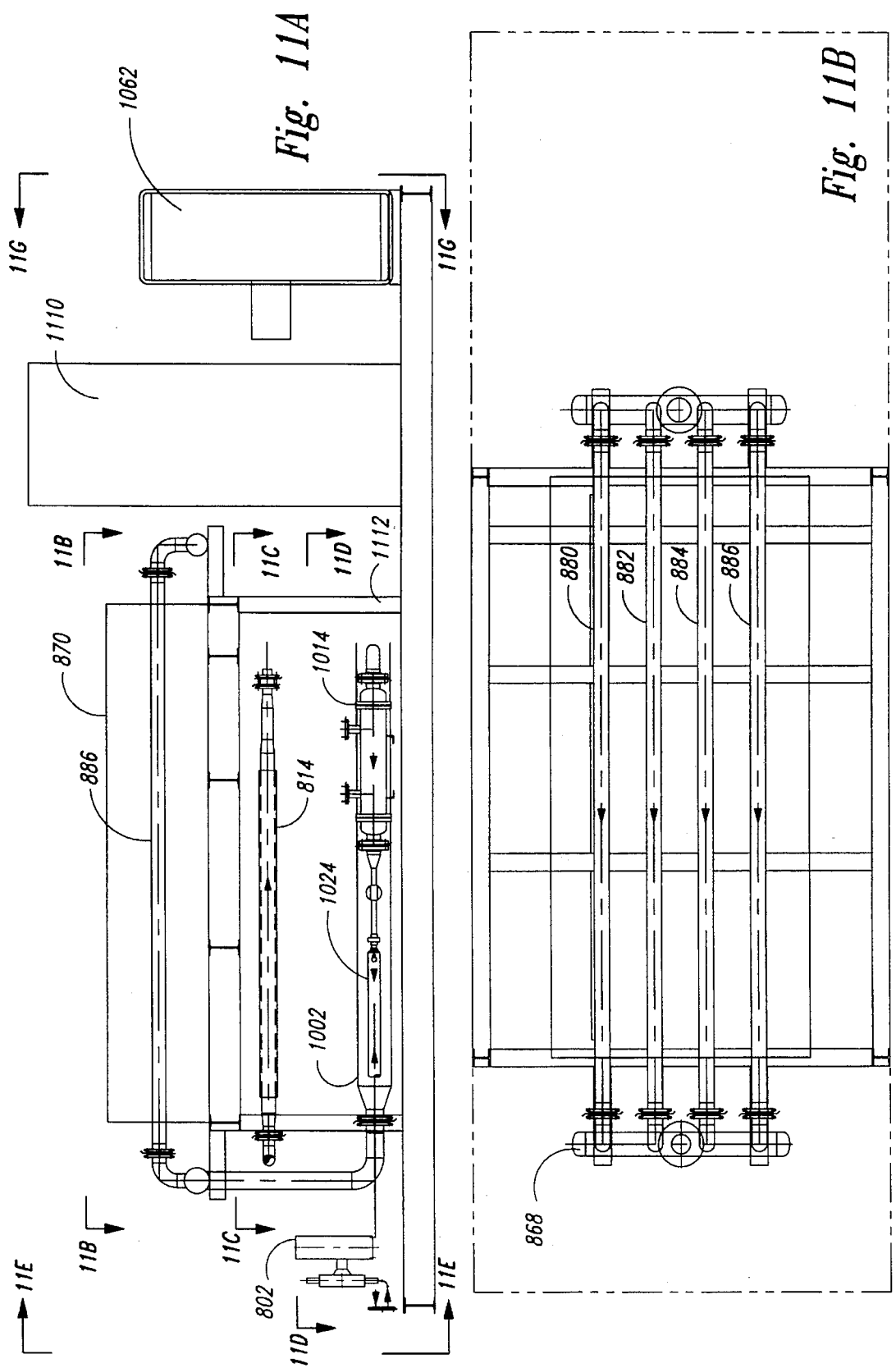

METHOD AND APPARATUS FOR THERMAL DECOMPOSITION AND SEPARATION OF COMPONENTS WITHIN AN AQUEOUS STREAM

TECHNICAL FIELD

This invention relates generally to the field of treating materials that present disposal problems and, more particularly, to a method and apparatus for thermally decomposing and/or separating components thereof within an aqueous stream and in an oxygen-deficient environment.

BACKGROUND OF THE INVENTION

The contamination of the environment by pollutants is a growing problem that is receiving increased recognition. Industrial and manufacturing processes are a major source of contaminating material in the environment and generate numerous materials that present disposal problems. In some cases, such materials may be ignitable, corrosive, unstable, radioactive or toxic, rendering them hazardous. In other cases, the materials may be non-hazardous (e.g., acetic acid or cooking oil) but may be present at levels which present disposal problems. In either case, disposal of such materials is often subject to extensive government regulation, which can make their treatment, storage and disposal very costly.

Toxic organic compounds, heavy metals and radioisotopes often pose particularly difficult problems for disposal. Compositions containing even low levels of such components may be classified by government regulatory agencies as hazardous materials. For example, in the United States, the Environmental Protection Agency (EPA) has set limits on the disposal of specific toxic compounds (see, e.g., 40 C.F.R. §61.24, and Table 1 therein). Any material that contains more than the specified limit of any listed toxic compound is defined as hazardous, and is subject to federal regulations controlling its handling and disposal. The EPA's lists of toxic compounds are quite extensive and much of the material generated by industrial processes is subject to government regulation.

In recent years, numerous methods for treating hazardous materials so as to render them less-hazardous have been developed. Perhaps the most common treatment is incineration. In this process, a material is heated in the presence of oxygen at sufficiently high temperatures such that the material undergoes combustion and breaks down into smaller, oxygen-containing components. Oxygen, sometimes in the form of air, is present in all incinerators in at least stoichiometric amounts (and generally in excess) so that complete combustion of the material can occur.

Some incinerators consist of a single incinerating chamber. In such incinerators, the material may be sprayed into an open flame, as in U.S. Pat. No. 3,734,035, or onto a heated hearth within the incineration chamber, as in U.S. Pat. No. 3,748,081. Other incinerators contain multiple sequential chambers that operate at successively higher temperatures. This design provides for more complete incineration of the material using less support fuel, since the gaseous materials generated at a lower temperature may contain combustible reactants which supplement and/or promote burning in the later chambers. An example of a multiple-chamber system for hazardous waste incineration is disclosed in U.S. Pat. No. 4,398,475. That system consists of a series of combustion chambers in which the material is burned at successively higher temperatures, and oxygen is supplied to each chamber in a stoichiometric amount to ensure complete combustion. Modifications may also be made to the incineration process specific for particular materials. For example, a catalyst may be added, as in U.S. Pat. No. 3,881,430, or a reducing agent may be included, as in U.S. Pat. No. 5,269,235.

Less frequently, a pyrolysis step is employed prior to combustion of the hazardous material. Pyrolysis is the heating of a material in the absence of oxygen. The products of pyrolysis depend upon the temperatures employed, but organic compounds generally form free radicals, which coalesce to form particulate materials (e.g., solid residues such as carbon black or char). In the process, hydrogen gas ($H_2$) is released. The use of a pyrolysis step in the treatment of hazardous materials is discussed, for example, in U.S. Pat. Nos. 4,279,208, 4,182,246 and 4,179,263. The treatment processes of those patents involve pyrolysis of organic compounds in an atmosphere with a low oxygen content to achieve partial oxidation of the compounds prior to incineration. Such a step apparently results in more efficient and complete combustion of the organic compounds during subsequent incineration. Pyrolysis has also been used to treat materials without incineration, since the particulate materials that remain after pyrolysis may be easier to dispose of than the original material.

Pyrolysis is most commonly used to break down large organic compounds to smaller hydrocarbon products. For example, in a form of pyrolysis known as cracking, large hydrocarbons are broken down to smaller hydrocarbons by heating in the absence of water or oxygen. In this process, random carbon-carbon bonds of the large hydrocarbons cleave to produce smaller free radicals which, in turn, generate the smaller hydrocarbons. For example, when a large alkane is pyrolized in this manner, the product is a mixture of smaller alkanes and alkenes. In a related process, known as steam cracking, large hydrocarbons can be cleaved to form smaller hydrocarbons by heating in the presence of relatively small amounts of water (generally 20% to 50% by weight). The products of steam cracking are most commonly olefins and aromatic compounds. Like cracking in the absence of water, steam cracking is used to generate hydrocarbon products.

Current methods for treating hazardous materials by incineration suffer from numerous inherent problems, including the emission of potentially toxic materials, inefficiency, inconvenience and high cost. The use of a pyrolysis step prior to incineration has not overcome these difficulties, and the use of pyrolysis as the sole method of treatment is limited to materials having a low water content. Furthermore, the treatment of chelated metals and radionuclides, by both incineration and pyrolysis methods, is particularly problematic because of the difficulty associated with separating the metal or radionuclide from the end product of such treatment. The separation from the chelating agent is important for minimizing the volume of the hazardous material, or for preparing a metal for reuse, but such separation has been difficult to achieve.

An alternate method for treating some types of organic materials is a process known as thermolytic detoxification. In this process, described in U.S. Pat. No. 4,874,587, as well as PCT Publication No. WO 90/10367, organic compounds are first vaporized by heating. The vaporized organic compounds are then combined with steam and heated to a high temperature. The mixture of steam and organic compounds is also passed through a heated, labyrinthine path which contains organically adsorbent materials which adsorb the organic compounds prior to subjecting the same to the high temperature. Water is present in excess of stoichiometry, but at a level that is less than 200% of stoichiometry and preferably 131% of stoichiometry. The combination of steam and organic compounds is recirculated in the system until treatment is complete. In a related process for treating medical waste, described in PCT Publication No. WO 94/20149, the waste is vaporized in superheated steam prior to treatment according to the above process.

In spite of the apparent advantages of thermolytic detoxification over existing incineration and pyrolysis techniques, the utility of this process is limited to a narrow range of organic compounds. For example, highly flammable or explosive materials cannot be treated by this technique, since the initial vaporization and/or treatment at elevated temperatures may cause fire or explosion. For organic compounds that may be decomposed by this method, such decomposition remains costly, since relatively high temperatures are required for treatment. In addition, inorganic materials (such as metals and inorganic salts) and radioactive materials are not suitable for treatment by this procedure.

Accordingly, there is a need in the art for a method and apparatus for treating materials that present disposal problems, and which are not subject to the limitations associated with existing incineration, pyrolysis and detoxification techniques. The present invention fulfills these needs, and provides further related advantages.

SUMMARY OF THE INVENTION

In brief, this invention is generally directed to a method and apparatus for treating materials that present disposal problems, so as to render such materials more suitable for disposal. As used herein, a "material" is a solid, liquid or gas that contains one or more components that present disposal problems, and therefore render the disposal of the material problematic. Such components are referred to as "disposal problem components" or "DPCs". In the practice of this invention, the DPCs are treated within an aqueous stream and under oxygen-deficient conditions. "Treatment" in the context of this invention refers to the thermal decomposition of one or more DPCs and/or the separation of one or more DPCs from other components of the material.

In one embodiment of this invention, a method for treating a material containing at least one DPC is provided. The method comprises (a) directing an aqueous stream comprising more than 50% water (by weight of the aqueous stream) and a material containing at least one DPC into an oxygen-deficient closed system, (b) subjecting the aqueous stream to a vaporization temperature sufficient to vaporize most of the water within the aqueous stream, and (c) subsequently subjecting the aqueous stream to a refractory temperature which is higher than the vaporization temperature and which is sufficient to thermally decompose or separate the DPC such that the material is rendered more suitable for disposal. In a related embodiment, the method further comprises subjecting the aqueous stream to an intermediate temperature (or temperatures), wherein the intermediate temperature is greater than or equal to the lowest temperature sufficient to vaporize most of the water within the aqueous stream, but less than the refractory temperature. The aqueous stream is subjected to the intermediate temperature (or temperatures) after it is subjected to the vaporization temperature and before it is subjected to the refractory temperature.

In another embodiment, an apparatus for treating DPCs is provided. The apparatus comprises an oxygen-deficient closed system containing a vaporization zone and a refractory zone, wherein the refractory zone is downstream from, and in fluid communication with, the vaporization zone. In addition, the closed system comprises an inlet upstream from the vaporization zone, an outlet downstream from the refractory zone, and one or more optional condensers located downstream from the refractory zone and in fluid communication with the outlet. In a further embodiment, the apparatus additionally comprises one or more intermediate temperature zones downstream from the vaporization zone and upstream from the refractory zone.

These and other aspects of this invention will become evident upon reference to the following figures and detailed description.

BRIEF DESCRIPTION OF THE DRAWINGS

FIG. 1A is a flow diagram of a representative procedure for determining the initial zone temperatures for treatment of any given material, while

FIGS. 10A, 10B and 10C illustrate the portion of the apparatus upstream of the condensers. FIGS. 10D and 10E illustrate the condenser portion of the apparatus.

FIGS. 11A through 11G illustrate a representative embodiment of an apparatus according to FIG. 10. FIG. 11A shows a side elevation view of the apparatus. FIGS. 11B–11D represent cross-sectional views at different elevations. FIG. 11E shows a front elevation view. FIG. 11F shows another cross-sectional view. FIG. 11G illustrates the rear elevation view of the apparatus.

DETAILED DESCRIPTION OF THE INVENTION

Figure 1A:
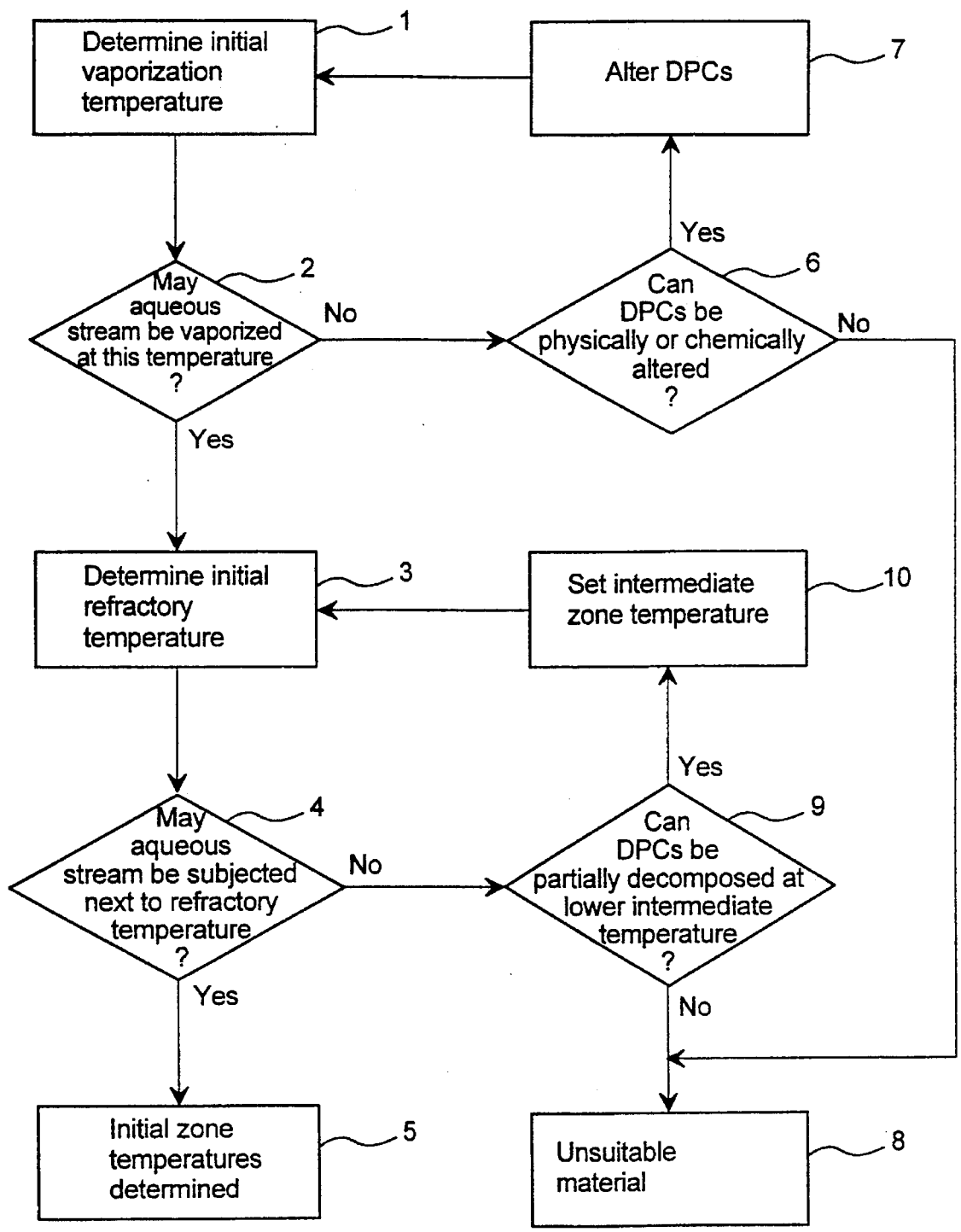

As mentioned above, this invention is generally directed to a method and apparatus for treating materials that present disposal problems. Materials suitable for treatment by the present invention are materials that contain one or more components which present disposal problems, and therefore render disposal of the material difficult. Such components are referred to herein as "disposal problem components" or "DPCs" (or as a "DPC" when referred to as a single component). DPCs include, but are not limited to, radioactive compounds, highly toxic compounds, binary chemicals (such as nerve gas), heavy metals, inorganic complexes (such as persulfates) and chelated compounds, particularly chelated metals and radionuclides.

Materials treated according to the method of this invention are rendered more suitable for disposal. "Treatment" includes both thermal decomposition and/or separation of one or more DPCs. For example, one or more DPCs may be thermally decomposed to smaller molecules, which are more amenable to disposal. Alternatively, one or more DPCs may be separated from the other components of the material. This separation alleviates the disposal problem by condensing the DPC(s) into a smaller volume for disposal. It should be understood that the treatment o f a single material may encompass both thermal decomposition and separation of DPCs.

In the practice of this invention, the material is treated within an aqueous stream. As used herein, an "aqueous stream" is a moving fluid containing water and a material to be treated. The water may be present in the aqueous stream in liquid form or in gas form, or as a mixture of the two in any ratio, and the amount present in each form varies depending upon the treatment parameters and the location of the aqueous stream within the treatment process. The aqueous stream contains a sufficient amount of water such that the boiling point of the stream is determined primarily by the boiling point of water. This may typically be achieved by ensuring that more than 50% by weight of the aqueous stream is water, preferably at least 75%, and more preferably at least 95%. In addition, the aqueous stream preferably contains more than 200% of the stoichiometric amount of water, and more preferably contains more than 300% of the stoichiometric amount of water. In other words, the stream preferably contains more than twice the amount of water that is necessary for complete conversion of the DPCs to components that contain no carbon-carbon or carbon-nitrogen bonds. This ensures that water is not a limiting reagent during treatment.

In the method of this invention, the aqueous stream (containing the material to be treated and water in liquid form) is first introduced into a vaporization zone, the temperature of which is sufficient to vaporize most of the water within the aqueous stream, preferably below 150° C. The vaporized aqueous stream then passes from the vaporization zone to a refractory zone, which is set at a temperature sufficient to thermally decompose or separate the most refractile DPC within the aqueous stream (i.e., the DPC that requires the highest temperature for decomposition and/or separation). Preferably, the temperature of the refractory zone does not significantly exceed 700° C. (All zone temperatures recited herein are internal temperatures—that is, the temperatures within the zones, rather than the external temperatures).

In other embodiments of this method, one or more intermediate temperature zones may be utilized, wherein the intermediate zones are set at temperatures less than the refractory temperature. Such intermediate zones may be used when one or more of the DPCs within the material cannot be taken directly from the vaporization temperature to the refractory temperature without undesirable consequences, such as an explosion. In such cases, the aqueous stream is treated at one or more intermediate temperatures to yield intermediate decomposition products of the problematic DPCs, which may then be subjected to the refractory temperature without incident. Intermediate temperatures may also be used to optimize treatment conditions. For example, the use of one or more intermediate temperatures may result in decomposition products that can be treated at a lower refractory temperature. In this manner, the refractory temperature necessary to treat the aqueous stream may be lowered, resulting in considerable energy savings.

Accordingly, the present invention is directed to a method and apparatus for treating a material containing one or more DPCs by subjecting the material to at least two distinct temperature zones (i.e., the vaporization zone and the refractory zone). Further intermediate temperature zones may be employed to avoid explosion or to optimize treatment conditions. Thus, the method and apparatus of this invention permit the treatment (by thermal decomposition, separation or a combination of the two) of a wide variety of materials containing multiple DPCs.

Since materials suitable for treatment by the present invention may contain numerous DPCs over wide concentration ranges, a preferred apparatus of this invention comprises a vaporization zone, a refractory zone, and several intermediate temperature zones. The temperature of each zone is individually controllable such that a single apparatus can be employed to treat a wide variety of materials. In other words, if the material can be treated by subjecting it to just the vaporization zone and the refractory zone, the apparatus can be set to operate as a "two-zone" system (i.e., vaporization zone and refractory zone). In such cases, the intermediate zones of the apparatus may be bypassed, or may be set at a temperature sufficient to maintain the vaporized state of the aqueous stream as it passes from the vaporization zone to the refractory zone. On the other hand, if treatment of a material requires two intermediate temperature zones, then the apparatus can be set to operate as a "four-zone" system (i.e., vaporization zone, refractory zone, and two intermediate temperature zones). Thus, by way of example, an apparatus having three intermediate zones may operate as a two-, three-, four- or five-zone system, and such an apparatus is sufficient to treat a large percentage of existing materials which present disposal problems. However, it should be understood that an apparatus having more than five-zones can be employed, and is within the scope of the present invention.

An important feature of this invention is the ability to individually control the temperature of the vaporization and refractory zones, as well as the temperature of any intermediate zones. Thus, the various zone temperatures can be set to treat a given material (which may contain a combination of DPCs), and then be reset to treat an entirely different material without physical modification of the apparatus itself. In addition to temperature, the flow rate of the material within the apparatus is also controllable, as is the pressure within the apparatus. The ability to control these parameters renders this invention extremely flexible in dealing with materials of diverse origin, as discussed in greater detail below.

Materials which are suitable for treatment by the present invention may be in the form of a solid, liquid or gas, and are materials that contain at least one DPC, and preferably multiple DPCs. DPCs of this invention are any and all compounds, molecules, mixtures or complexes which present disposal problems at the concentrations present in the material. Such DPCs may generally be classified as either hazardous or non-hazardous. For example, hazardous DPCs include flammable, corrosive, unstable, radioactive or toxic compounds, binary chemicals (such as nerve gas), as well as oxidants, acids and bases. Hazardous DPCs may be organic or inorganic, including inorganic complexes (such as ammonium persulfate), heavy metals and radionuclides in chelated and non-chelated form. Similarly, non-hazardous DPCs are typically compounds that present disposal problems due, for example, to their high concentration in a given material, and include organic salts and cooking oils.

DPCs of this invention include (but are not limited to) compounds which have been (or are in the future) deemed hazardous by one or more regulatory agencies, such as the EPA. Representative organic DPCs include the compounds listed in Table 1, which is reprinted from James H. McGill and John M. Quiel, *Incineration of Hazardous, Toxic, and Mixed Wastes* (North American Manufacturing Co.) (incorporated herein by reference). In addition to identifying representative organic DPCs of this invention, Table 1 also lists the thermal stability temperature (defined as the temperature at which 99% of a compound decomposes in the presence of oxygen) for each of these compounds. The thermal stability temperature may be used to set the initial treatment parameters, as is discussed in greater detail below.

TABLE 1

Representative Thermal Stability Temperatures for Organic DPCs

| DPC | T99 (°C.) | DPC | T99 (°C.) |
| --- | --- | --- | --- |
| Acetonitrile (Ethanenitrile) | 1000 | Acrylonitrile (2-Propenenitrile) | 985 |
| Benzanthracene (1,2) (Benz[a]anthracene) | 1060 | Benzene | 1150 |
| Benzo(a)pyrene (1,2-Benzopyrene) | 1025 | Benzo(b)fluoranthene (2,3-Benzofluoranthene) | 1060 |
| Benzo(j)fluoranthene (7,8-Benzofluoranthene) | 1060 | Bromomethane (Methylbromide) | 935 |
| Chlorobenzene | 990 | Chlorodibenzo-P-Dioxin (2-) | 925 |
| Chlorodibenzo-P-Dioxin (1-) | 960 | Chloromethane (Methyl Chloride) | 950 |
| Chloronaphthalene (1-) | 975 | Chlorotrifluoromethane(c,d) | 1010 |
| Chrysene (1,2-Benzphenanthrene) | 1060 | Cyanogen Bromide (Bromine Cyanide) | 970 |
| Cyanogen Chloride (Chlorine Cyanide) | 1000 | Cyanogen (Ethanedinitrile) | 1500 |
| Dibenz(a,h)anthracene (1,2,5,6-Dibenzanthracene) | 1020 | Dibenzo(a,s)pyrene (1,2,4,5-Dibenzopyrene) | 1020 |
| Dibenzo(a,h)pyrene (1,2,5,6-Dibenzopyrene) | 1020 | Dibenzo(a,i)pyrene (1,2,7,8-Dibenzopyrene) | 1020 |
| Dichlorobenzene (1,2-Dichlorobenzene) | 970 | Dichlorobenzene (1,3-Dichlorobenzene) | 960 |
| Dichlorobenzene (1,4-Dichlorobenzene) | 975 | Dichlorobenzo-P-Dioxin (2,7-) | 920 |
| Fluoranthene (Benzo[j,k]fluorene) | 1062 | Hexachlorobenzene | 935 |
| Hydrogen Cyanide (Hydrocyanic Acid) | >1500 | Indeno(1,2,3-cd)pyrene (1,10-[1,2-Phenylene]pyrene) | 1060 |
| Napthalene | 1070 | Pentachlorobenzene | 935 |
| Sulfur Hexafluoride | 1090 | 1,2,3,5-Tetrachlorobenzene | 955 |
| 1,2,4,5-Tetrachlorobenzene | 940 | 1,2,4-Trichlorobenzene | 955 |
| 1,3,5-Trichlorobenzene | 950 | | |
| Acetylaminofluorene (2-) (Acetamide,n-[9H-Fluoren-2-yl]-) | 800 | Acrylamide (2-Propenamide) | 820 |
| Aniline | 850 | Chloroaniline | 810 |
| Chloro-1,3-Butadiene (2-) (Chloroprene) | 800 | DDE (1,1-Dichloro-2,2-Bis (4-Chlorophenylethylene) | 875 |
| Dichlorodibenzo-P-Dioxin (2,3-) | 875 | Dichloroethene (1,1-) | 860 |
| Dichloroethene (trans-1,2-) | 835 | Dichloromethane (Methylene Chloride) | 815 |
| Dimethylbenz(a)anthracene (7,12-) | 855 | Dimethylphenethylamine (alpha,alpha-) | 840 |
| Diphenylamine (N-Phenylbenzenamine) | 800 | Fluoroacetamide (2-) | 830 |
| Fluoroacetic Acid | 860 | Formaldehyde (Methylene Oxide) | 850 |
| Formic Acid (Methanoic Acid) | 870 | Malononitrile (Propanedinitrile) | 840 |
| Methacrylonitrile (2-Methyl-2-Propenenitrile) | 815 | Methyl Chlorocarbonate (Carbonochloridic Acid, Methyl Ester) | 850 |
| Methylcholanthrene (3-) | 805 | Methyl Isocyanate (Methylcarbylamine) | 850 |
| Methyl Methacrylate (2-Propenoic Acid, 2-Methyl-,Methyl Ester) | 820 | Naphtylamine (1-) | 840 |
| Naphthylamine (2-) | 840 | Phosgene (Carbonyl Chloride) | 870 |
| Pronamide (3,5-Dichloro-N-[1,1-Dimethyl-2-Propynyl]Benzamide) | 800 | Tetrachlorodibenzo-P-Dioxin (1,2,3,4-) | 845 |
| Tetrachlorodibenzo-P-Dioxin (2,3,7,8-) | 865 | Tetrachloroethene | 890 |
| Toluene (Methylbenzene) | 895 | Trichlorodibenzo-P-Dioxin (1,2,4-) | 860 |
| Trichloroethene | 865 | Ethylenediamine Tetraacetic Acid (EDTA) | 252 |
| Acetonylbenzyl-4-Hydroxycoumarin (3-alpha-) (Warfarin) | 760 | | |
| Acetophenone (Ethanone, 1-Phenyl-) | 775 | Acetyl Chloride (Ethanoyl Chloride) | 765 |
| Aminobiphenyl (4-) ([1,1'-Biphenyl]-4-Amine) | 796 | Benz(c)acridine (3,4-Benzacridine) | 775 |
| Benzenethiol (Thiophenol) | 725 | Benzidine ([1,1'-Biphenyl]-4,4'-Diamine) | 794 |
| Benzoquinone (1,4-Cyclohexadienedione) | 770 | Chlorophenol (2-) | 795 |
| Chlorophenol (3-) | 785 | Chlorophenol (4-) | 755 |
| Chlorocresol (4-Chloro-3-Methylphenol) | 709 | Cresol (1,2-) (Methylphenol) | 746 |
| Cresol (1,3-) ((Methylphenol) | 749 | Cresol (1,4-) (Methylphenol) | 745 |

TABLE 1-continued

Representative Thermal Stability Temperatures for Organic DPCs

| DPC | T99 (°C.) | DPC | T99 (°C.) |
|---|---|---|---|
| Crotonaldehyde (2-Butenal) | 710 | Dibenz(a,h)acridine (1,2,5,6-Dibenzacridine) | 765 |
| Dibenz(a,j)acridine (1,2,7,8-Dibenzacridine) | 765 | Dibenzo(c,g)carbazole (7H-) (3,4,5,6-Dibenzcarbazole) | 750 |
| Dichlorobenzidine (3,3'-) | 795 | Dichlorodifluoromethane (Freon 12) | 775 |
| Dichloropropene (1,1-) | 780 | Dichloropropene (2,3-) | 754 |
| Dichloropropene (trans-1,2-) | 750 | Dichlorophenol (2,4-) | 710 |
| Dichlorophenol (2,6-) | 740 | Dichloro-2-Butene (1,2-) | 755 |
| Diethylstilbesterol | 730 | Dihydroxy-Alpha-(Methylamino) Methyl Benzyl Alcohol (3,4-) (Adrenaline) | 705 |
| Dimethylbenzidine (3,3'-) | 793 | Dimethylphenol (2,4-) | 700 |
| Dimethyl Phthalate | 765 | Ethyl Cyanide (Propionitrile) | 770 |
| Hexachlorobutadiene (trans-1,3) | 765 | Isobutyl Alcohol (2-Methyl-1-Propanol) | 715 |
| Maleic Anhydride (2,5-Furandione) | 760 | Methylactonitrile (2-) (Propanenitrile, 2-Hydroxy-2-Methyl) | 705 |
| Methyl Ethyl Ketone (2-Butanone) | 730 | Napththoquinone (1,4-) (1,4-Naphthalenedione) | 765 |
| n-Propylamine (1-Propanamine) | 789 | Phenol (Hydroxybenzene) | 775 |
| Phenylanediamine (1,2-) (Benzenediamine) | 791 | Phenylanediamine (1,3-) (Benzenediamine) | 792 |
| Phenylenediamine (1,4) (Benzenediamine) | 790 | Picoline (2-) (Pyridine,-2-Methyl-) | 780 |
| Pyridine | 785 | Resorcinol (1,3-Benzenediol) | 750 |
| Thioacetamide (Ethanethioamide) | 780 | Toluenediamine(2,4-) (Diaminotoluene) | 750 |
| Toluenediamine (2,4-) (Diaminotoluene) | 750 | Toluenediamine (2,5-) (Diaminotoluene) | 750 |
| Toluenediamine (2,6-) (Diaminotoluene) | 750 | Toluenediamine (3.4-) (Diaminotoluene) | 750 |
| Toluenediamine (3,5-) (Diaminotoluene) | 750 | Trichlorofluoromethane (Freon 11) | 775 |
| Trichloro(1,2,2-)Trifluoroethane(1,1,2-) (Freon 113) | 780 | Vinyl Chloride (Chloroethane) | 770 |
| Acrolein (2-Propenal) | 670 | Aldrin | 632 |
| Allyl Alcohol (2-Propen-1-O1) | 665 | Auramine | 618 |
| Benzal Chloride (Alpha, Alpha-Dichlorotoluene) | 630 | Benzotrichloride (Trichloromethylbenzene) | 600 |
| Benzyl Chloride (Chloromethylbenzene) | 685 | bis(2-Chloroethoxy) Methane | 610 |
| bis(2-Chloroethyl) Ether | 615 | Bromocetone (1-Bromo-2-Propanone) | 670 |
| Butyl-4,6-Dinitrophenol (2-sec-) (DNBP Chlorambucil | 613 | Chloral (Trichloroacetaldehyde) | 610 |
| Chlorodifluoremethane (Freon22) | 659 | Chloroacetaidehyde | 630 |
| Chloropropene (3-) (Allyl Chloride) | 645 | Chloroethane (Ethyl Chloride) | 670 |
| | 695 | Chloropropionitrile (3-) (3-Chloropropanenitrile) | 655 |
| Chloro-2,3-Epoxypropane (1-) (Oxirane, 2-Chloromethyl-) | 615 | Cyclohexyl-4,6-Dinitrophenol (2-) | 613 |
| DDD (Dichlorodiphenyldichloroethane) | 654 | DDT (Dichlorodiphenyltrichloroethane) | 620 |
| Dibromomethane (Methylene Bromide) | 685 | Dibromoethane (1,2-) (Ethylene Dibromide) | 630 |
| Dichloroethene (1,1-) ·(Ethylidene Dichloride) | 610 | Dichloroethene (1,3-) | 680 |
| | | Dichlorofluoromethane (Freon 21) | 640 |
| Dichloropropene (1,1-) | 615 | Dichloropropane (1,2-) (Propylene Dichloride) | 620 |
| Dichloropropane (1,3-) | 630 | Dichloropropene (3,3-) | 690 |
| Dichloropropene (cis-1,3-) | 625 | Dichloropropene (trans-1,3-) | 625 |
| Dichloro-1-Propanol (2,3-) | 625 | Dichloro-2-Propanol (1,1-) | 654 |
| Dichloro-2-Propanol (1,3-) | 652 | Dieldrin | 632 |
| Diepoxybutane (1,2,3,4-) (2,2'-Bioxirane) | 604 | Dimethylcarbamoylchloride | 620 |
| Dinitrobenzene (1,2-) | 635 | Dinitrobenzene (1,3-) | 640 |
| Dinitrobenzene (1,4-) | 635 | Dinitrocresol (4,6-) (Phenol,2,4-Dinitro-6-Methyl-) | 610 |
| Dinitrophenol (2,4-) | 615 | Dinitrotoluene (2,4-) | 625 |
| Dinitrotoluene (2,6-) | 625 | Dioxane (1,4-) (1,4-Diethylene oxide) | 660 |
| Ethylene Oxide (Oxirane) | 625 | Glycidyaldchyde (1-Propanol-2,3-Epoxy) | 620 |
| Heptachlor | 618 | Heptachlor Epoxide | 609 |
| Hexachlorocyclohexane (Lindane) | 640 | Hexachlorcyclopentadiene | 625 |
| Hexachlorophene (2,2'-Methylenebis[3,4,6-Trichlorophenol]) | 670 | Hydrazine (Diamine) | 685 |
| Isodrin | 632 | Methapyrilene | 600 |
| Methyl Parathion | 650 | Mustard Gas (bis[2-Chloroethyl]-Sulfide) | 679 |
| Nitroaniline (4-Nitrobenzenamine) | 640 | Nitrobenzene | 655 |
| Nitrogen Mustard | 679 | Nitrophenol (4-) | 650 |
| Nitrotoluidine (5-) (Benzenamine, 2-Methyl-5-Nitro-) | 630 | N,N-bis (2-Chlorethyl) 2-Naphthylanmine (Chloroaphazine) | 679 |
| Pentachloroethane | | Pentachlorophenol | 640 |
| Phthalic Anhydride (1,2-Benzenedicarboxylic Acid Anhydride) | 650 | Tetrachloroethane (1,1,2,2) | 690 |
| Tetrachloromethane (Carbon | 645 | Tetrachlorophenol (2,3,4,6-) | 645 |

TABLE 1-continued

Representative Thermal Stability Temperatures for Organic DPCs

| DPC | T99 (°C.) |
|---|---|
| Tetrachloride) | |
| Trichloroethane (1,1,2-) | 635 |
| Trichloromethane (Chloroform) | 625 |
| Trichloromethanethiol | 610 |
| Trichlorophenol (2,4,5-) | 650 |
| Trichlorophenol (2,4,6-) | 650 |
| Trichloropropane (1,2,3-) | 625 |
| Trinitrobenzene (1,3,5-Trinitrobenzene) | 615 |
| Aflaxatoxins | 590 |
| Amitrole (1H-1,2,4-Triazol-3-Amine) | 580 |
| Aramite | 500 |
| bis-(Chloromethyl) Ether (Methiane-Oxybis[2-Chloro-]) | 530 |
| bis(2-Chloroisopropyl) Ether | 520 |
| Bromoform (Tribromomethane) | 585 |
| Bromophenyl Phenyl Ether (4-) (Benzene, 1-Bromo-4-Phenoxy-) | 533 |
| Brucine (Strychnidin-10-One,2,3-Dimethoxy-) | 470 |
| Chlordane (Alpha and Gamma Isomers) | 533 |
| Chlorobenzilate | 584 |
| Chloroethylvinylether (2-) (Ethane,8 2-Chloroethoxy]-) | 565 |
| Chloromethylmethyl Ether (Chloromethoxymethane) | 550 |
| Diallate (S-[2,3-Dichloroallyl]Diisopropyl Thiocarbamate) | 500 |
| Dibromo-3-Chloropropane (1,2-) | 561 |
| Dichlorophenoxyacetic Acid (2,4-) (2,4-D) | 565 |
| Dichloropropane (2,2-) | 530 |
| Diethylphthalate | 400 |
| Dihydrosafrole (1,2-Methylenedioxy-4-Propylbenzene) | 520 |
| Dimethoate | 500 |
| Dimethylaminoazobenzene | 405 |
| Dimethoxygenzidine (3,3'-) | 453 |
| Dimethythydrazine (1,1-) | 555 |
| Dimethylhydrazine (1,2-) | 550 |
| Dimethyl-1-Methylthio-2-Butanene, O-([Methylamino]-Carbonyl) | 530 |
| Diphenylhydrazine (1,2-) | 450 |
| Ethyl Carbamate (Urethan) (Carbamic Acid, Ethyl Ester) | 564 |
| Ethyleneimine (Aziridine) | 500 |
| Ethyl Methacrylate (2-Propenoic Acid, 2-Methyl-, Ethyl Ester) | 584 |
| Hexachloroethane | 585 |
| Hexachloropropene | 505 |
| Iodomethane (Methyl Iodide) | 567 |
| Isosafrole (1,2-Methylenedioxy-4-Allylbenzene) | 460 |
| Kepone | 470 |
| Lasiocarpine | 584 |
| Maleic Hydrazide (1,2-Dihydro-3,6-Pyridazinedione) | 525 |
| Methoxychlor | 490 |
| Methylaziridine (2-) (1,2-Propylenimine) | 490 |
| Methylene Bis (2-Chloroaniline) (4,4-) | 565 |
| Methyl Hydrazine | 593 |
| Methyl Methanesulfonate (Methanesulfonic Acid, Methyl Ester) | 515 |
| Methyomyl | 510 |
| Methyl-2-Methylthio-Propionaldehyde-O-(Methylcarbonyl) Oxime (2-) | 510 |
| Musoimol (5-Aminomethyl-3-Isoazotal) | 580 |
| n-Butylbenzyl Phthalate | 415 |
| N,N-Diethylhydrazine (1,2-Diethylhydrazine) | 555 |
| O,O-Diethylphosphoric Acid, O-p-Nitrophenyl Ester | 425 |
| O,O-Diethyl-O-2-Pyrazinyl Phosphorothioate | 410 |
| Parathion | 530 |
| Pentachloronitrobenzene (PCNB) | 500 |
| Phenacetin (N-[4-Ethoxyphenyl]Acetamide) | 593 |
| Propane Sulfone (1,3-) (1,2-Oxathiolane, 2,2-Dioxide) | 513 |
| Propyn-1-Ol (2-) (Propargyl Alcohol) | 560 |
| Saccharin (1,2-Benzoisothiazolin-3-One, 1,1-Dioxide) | 511 |
| Safrole (1,2-Methylene-4-Allylbenzene) | 460 |
| Tetrachloroethane (1,1,1,2-) | 560 |
| Trichloroethane (1,1,1-) (Methyl Chloroform) | 545 |
| Trichlorophenoxyacetic Acid (2,4,5-) (2,4,5-T) | 495 |
| Trichlorophenoxypropionic Acid (2,4,5-) (2,4,5-TP) (Silvex) | 495 |
| tris(1-Azridinyl) Phosphine Sulfide | 460 |
| tris(2,3-Dibromopropyl) Phosphate | 492 |
| bis(2-Ethylhexyl)Phthalate | 370 |
| Citrus Red No. 2(2-Naphthol, 1-[(2,5-Dimethoxyphenyl]Aso)) | 395 |
| Cyclophosphamide | 300 |
| Diisopropylfluorophosphate (DFP) | 390 |
| Di-n-Butyl Phthalate | 390 |
| D-n-Octyl Phthalate | 380 |
| Disulfoton | 390 |
| Ethyl Methanesulfonate (Methanesulfonic Acid, Ethyl Ester) | 390 |
| Methylthiouracil | 370 |
| Nicotine ([S]-3-[1-Methyl-2-Pyrrolidinyl]Pyridine) | 300 |
| Octamethylpyrophosphoramide (Octamethyidiphosphoramide) | 374 |
| O,O-Diethyl S-([Ethylthio]Methyl) Ester of Phosphorodithioic Acid | 395 |
| O,O-Diethyl-S-Methyl Ester of Phosphoric Acid | 395 |
| O,O,O-Triethyl Phosphorothioate | 390 |
| Paraidehyde (2,4,6-Trimethyl-1,3,5-Trioxane) | 380 |
| Propylthiouracil | 360 |
| Reserpine | 380 |
| Strychnine (Strychnidin-10-One) | 320 |
| Toluidine Hydrochloride (2-Methyl-Benzenamine Hydrochloride) | 300 |
| Trypan Blue | 392 |

TABLE 1-continued

Representative Thermal Stability Temperatures for Organic DPCs

| DPC | T99 (°C.) | DPC | T99 (°C.) |
|---|---|---|---|
| Acetyl-2-Thiourea (1-) (Acetamide,N-[Aminothioxomethyl]-) | 240 | | |
| Azaserine (L-Serine, Diazoacetate[Ester]) | 200 | Butatone Peroxide (2-) (Methyl Ethyl Ketone, Peroxide) | 280 |
| Chlorophenyl Thiourea (1-) (Thiourea,[2-Chlorophenyl]-) | 240 | Cycasin (beta-D-Glucopyranoside, [Methyl-Onn-Azoxy]Methyl-) | 170 |
| Daunomycin | 230 | Di-n-Propylnitrosamine (N-Nitroso-Di-n-Propylamine) | 130 |
| Dithiobiuret (2,4-) (Thioimidodicarbonic Diamide) | 220 | Endosulfan | 100 |
| Endrin | 285 | Ethylenebis Dithiocarbamic Acid | 250 |
| Ethylene Thiourea (2-Imidazolidinethione) | 230 | Hexaethyl Tetraphosphate | 190 |
| Melphalan (Alanine,3-[p-bis(2-Chloroethyl)Amino] Phenyl-,L-) | 225 | Naphthyl-2-Thiourea (1-) (Thiourea, 1-Naphthalenyl-) | 240 |
| Nitrogen Mustard N-Oxide | 170 | Nitroglycerine (Trinitrate-1,2,3-Propaneltriol) | 255 |
| Nitroquinoline-1-Oxide (4-) | 170 | Nitrosopyrrolidine (N-Nitrosotetrahydropyrrole) | 130 |
| N-Methyl-N'-Nitro-N-Nitrosoguanidine | 130 | N-Nitroso-Di-Ethanotamine ([2,2'-Nitrosoimino]bisEthanol) | 130 |
| N-Nitrosodiethylamine (N-Ethyl-N-Nitrosoethanamine) | 130 | N-Nitrosodimethylamine (Dimethylnitrosamine) | 130 |
| N-Nitroso-Di-N-Butylamine (N-Butyl-N-Nitroso-1-Butanamine) | 130 | N-Nitrosomethylethylamine (N-Methyl-N-Nitrosoethanamine) | 130 |
| N-Nitrosomethylvinylamine (N-Methyl-N-Nitrosoethenamine) | 130 | N-Nitrosomorpholine | 130 |
| N-Nitroso-N-Ethylurea (N-Ethyl-N-Nitrosocarbamide) | 130 | N-Nitroso-N-Methylurea (N-Methyl-N-Nitrosocarbamide) | 130 |
| N-Nitroso-N-Methylurethane | 130 | N-Nitrosonomicotine | 130 |
| N-Nitrosopiperidine (Hexahydro-N-Nitrosopyridine) | 130 | N-Nitrososarcosine | 130 |
| N-Phenylthiourea | 240 | Oxabicyclo(2,2,1)Heptane-2,3-Dicarboxylic Acid (7-) (Endothal) | 120 |
| Streptosotocin | 155 | Tetraethyldithiopyrophosphate | 250 |
| Tetraethylpyrophosphate | 255 | Tetranitromethane | 245 |
| Thiosemicarbazide (Hydrazinacarbothioamide) | 225 | Thiourea (Thiocarbamide) | 240 |
| Thiuram (bis[Dimethylthiocarbamoyl]Disulfide) | 220 | Toluene Diisocyanate (1,3-Diisocyanatomethylbenzene) | 290 |
| Uracil Mustard (5-[bis(Chloroethyl)Amino]Uracil) | 246 | | |

In the practice of this invention, the DPCs present in the aqueous stream are treated under oxygen-deficient conditions. More specifically, treatment occurs in the absence of oxygen gas (i.e., $O_2$), except to the extent that minimal levels of oxygen may be present within the aqueous stream itself. Such oxygen levels, however, are limited by the amount of oxygen that may be dissolved in the aqueous stream, and are thus quite small (generally between about 5 and 15 mg dissolved oxygen per liter of water). More specifically, the Bunsen coefficient of oxygen gas in this context is less than 0.03, and typically from 0.002 to 0.02. The Bunsen coefficient represents, at standard temperature and pressure, the volume of a gas absorbed per unit volume of liquid. It is critical that treatment take place under oxygen-deficient conditions. Accordingly, no oxygen may be introduced into the apparatus during treatment.

Since the method of this invention requires oxygen-deficient conditions, the apparatus is appropriately constructed to be a "closed system." As used herein, this term means that the apparatus is sealed to prevent exchange of oxygen with the outside environment. The aqueous stream enters the apparatus by way of the inlet, which is connected to the vaporization zone, and travels to the refractory zone where it exits from the apparatus by way of the outlet connected to the refractory zone. As mentioned above, the aqueous stream may pass directly from the vaporization zone to the refractory zone (i.e., a two-zone system), or it may pass through one or more intermediate temperature zones before passing to the refractory zone (e.g., a three-, four- or five-zone system). However, each and every zone within the apparatus, and all connections between zones, are sealed to prevent exchange of oxygen with the outside environment. Upon exiting the refractory zone, the aqueous stream is preferably cooled by condensation, and then disposed of in an appropriate manner.

In the course of treatment, organic DPCs are broken down into smaller constituent molecules, such as $CO_2$, $H_2O$, $SO_4^=$, $NO_x$ and $N_2$, while halogens are converted to their corresponding halide ion. Preferably, organic DPCs are broken down to molecules that do not contain carbon-carbon or carbon-nitrogen bonds. Thus, the aqueous stream initially containing organic DPCs is converted into an aqueous stream containing dissolved components which are more suitable for disposal than the original DPCs. Treatment according to this invention also decomposes inorganic complexes, generating small constituent molecules that are more suitable for disposal. For example, ammonium persulfate may be decomposed to generate $N_2$, $H_2$ and $SO_4^=$.

Treatment according to the present invention also converts chelated metals and radionuclides to their "free" or non-chelated form, which is more amenable to disposal. A variety of organic compounds may serve as chelating agents.

Typically such compounds are capable of donating electrons and occupy coordination sites of a metal. EDTA is a common chelating agent. Any chelating agent may be removed by treatment according to this invention. Such treatment may also result in a change in the oxidation state of metals. Heavy metals may be deposited or plated on the walls of the closed system during treatment, generally on the internal walls of the refractory zone. If the aqueous stream contains consistently large amounts of metals, it may be necessary to periodically replace the portion of the apparatus having the deposited or plated metals. This portion of the apparatus may then be disposed of in the same manner as other deposited or plated metals. Alternatively, the deposited or plated metals may be removed from the walls of the apparatus by dissolving in an appropriate solvent, or by mechanically reaming the apparatus. In either case, the separation of the metal from the remainder of the material results in a substantial reduction in the volume of the material containing that DPC, thereby greatly reducing the problems associated with disposal.

Thus, the present invention is distinct from existing combustion or incineration processes, which burn materials in the presence of oxygen, and preferably in the presence of an excess of oxygen. It also differs from traditional pyrolysis techniques, including steam cracking, in a variety of aspects. Such techniques invariably generate compounds having carbon chains. In the context of the present invention, carbon chains are broken down, preferably to molecules that do not contain carbon-carbon bonds. Furthermore, even in steam cracking, the water level is minimized, generally below 50% by weight. At such levels, the water is a limiting reagent. In contrast, the present invention employs water in excess. In addition, unlike the present invention, pyrolysis is generally performed in a single reaction zone, at a single temperature. The use of multiple temperature zones in the present invention provides increased flexibility for treating a variety of DPCs. Finally, while catalysts are often employed in pyrolysis, no catalysts are necessary for treatment according to this invention, although catalysts may be beneficial for some materials.

The present invention is also distinct from thermolytic detoxification processes. In thermolytic detoxification, the amount of water present during treatment is maintained slightly in excess of the stoichiometric amount. In contrast, the present invention employs a considerable excess of water. In addition, vaporization of DPCs according to this invention occurs while the DPCs are present in an aqueous stream, and is performed at or near the boiling point of water. This permits the treatment of explosive and flammable compounds, as well as solid materials. In thermolytic detoxification, a hazardous organic material is initially volatilized in the absence of water, which presents a danger of explosion or fire, or (in the case of medical waste) is volatilized in the presence of superheated steam, which presents similar problems. The temperatures employed in treatment according to the present invention are lower than temperatures required for thermolytic detoxification. The present invention also does not require recirculation within the system during treatment or the use of an adsorbent material within any reaction zone. Unlike thermolytic detoxification, the introduction of oxygen during treatment according to this invention is to be avoided.

While the present invention has been disclosed in general terms above, the following disclosure provides a more detailed treatment of both the method and apparatus of this invention. In the practice of this invention, the components of the material to be treated, specifically the DPCs within the material, are first determined. In many instances, the identity and amount of the DPCs within the material are known and analysis of the material is not necessary, other than for verification purposes. In most other cases, the history of the material will indicate the presence of specific DPCs, although the precise amounts of each DPC may not be known. This type of material may be analyzed according to analytical procedures known to those skilled in the art for detecting the DPCs likely to be present. Appropriate methods are described, for example, in EPA Publication SW-846, "Methods for the Examination of Solid Waste", (incorporated herein by reference). More specifically, appropriate analytical procedure(s) are disclosed for various DPCs in Appendix III to 40 C.F.R. part 261, which is reprinted in EPA Form 8700-12 (incorporated herein by reference). In some instances, there may be little information about the material to be treated. In such cases, analytical methods appropriate for detecting a broad spectrum of DPCs should be employed. For example, chromatographic methods may be used to identify and measure organic constituents, and metals may be assayed using Atomic Emission Spectroscopy or Atomic Absorption Spectroscopy. The concentration of such DPCs may then be determined by known techniques, as described above.

Once the DPCs of the material are known, an aqueous stream containing the material is generated. In many cases, the material to be treated will itself be an aqueous solution containing more than 50% water. For such materials, the material may be suitable for use as the aqueous stream without further modification. In other instances, it may be necessary to dilute or dissolve the material in water to generate the aqueous stream. This is typically necessary when the material is in the form of a water soluble solid or liquid. Materials which are gaseous, or are not water soluble, may be injected into a stream of water (prior to introduction into the vaporization zone) to generate the aqueous stream. In this manner, immiscible solids and liquids and miscible and immiscible gases may be incorporated into the aqueous stream in known and reproducible quantities. Appropriate techniques for injection of such materials into water to generate the aqueous stream are known to those skilled in the art. In a preferred embodiment, the aqueous stream is maintained, prior to entry into the closed system, at a temperature sufficient to prevent ice formation (which may be a problem if operating in a cold climate), and below about 40° C.

The aqueous stream containing the material contains water in an amount greater than 50% by weight. Preferably, at least 75% of the aqueous stream is water, and more preferably at least 95% of the stream is water. In a preferred embodiment, the aqueous stream contains more than 200% of the stoichiometric amount of water (i.e., more than twice the amount of water necessary for complete conversion of any organic DPCs to components that contain no carbon-carbon bonds). In a more preferred embodiment, the aqueous stream contains more than 300% of the stoichiometric amount of water. For the purpose of calculating the stoichiometric amount of water, it can be assumed that all carbon atoms contained in the material are converted to $CO_2$, and that all oxygen atoms present in the $CO_2$ are derived from the organic DPC or from water. The stoichiometric amount of water (expressed as a weight percent) may then be calculated by multiplying the weight percent of the DPC by the number of water molecules required (per molecule of component) and by the molecular weight ratio (water/compound). For example, a molecule of acetone may react with five molecules of water, according to the following equation:

$$CH_3COCH_3 + 5H_2O \rightarrow 3 CO_2 + 8H_2$$

For a material containing 25 weight percent acetone (which has a molecular weight of 60 g/mol), the stoichiometric amount of water (which has a molecular weight of 18 g/mol) may be calculated as follows:

(25% acetone)×(5 mol $H_2O$/mol acetone)×18/60=37.5% water

Thus, an aqueous stream that contained 25 weight percent acetone in water would contain 75 weight percent water, which is twice the stoichiometric amount. A similar calculation may be repeated for each organic DPC in the material, and the stoichiometric amount of water for treatment of the material is the sum of each of the calculated stoichiometric amounts for the component DPCs.

After generating the aqueous stream, the initial treatment parameters for the various zones of the apparatus are determined. To this end, there are several individually controllable parameters that affect treatment of the material. These "treatment parameters" are (1) the pressure within each zone, (2) the temperature of each zone and (3) the flow rate, which in turn affects the dwell time in each zone (i.e., the amount of time the aqueous stream remains in a given zone). Briefly, pressure within each zone is primarily a function of the flow rate and temperature of the aqueous stream, as well as the volume of the zone and the condenser temperature. The temperature for each zone is controllable by adjusting the heating means associated with each zone. The flow rate may be controlled, for example, using a metering pump. The control of each of these parameters is discussed in greater detail below.

The overall system pressure may be controlled by varying the condenser temperature (i.e., the use of a higher condenser temperature results in a higher system pressure). For a given system pressure, the flow rate, temperature and volume (e.g., pipe diameter) determine the differential pressures as the stream passes from zone to zone. To increase the pressure within a zone, the flow rate or temperature may be increased or the volume may be decreased. Control of pressure is particularly important in the context of this invention because, by increasing the pressure, higher vaporization and intermediate zone temperatures may be employed without completely vaporizing the aqueous stream. As discussed in greater detail below, such control allows the treatment of DPCs that are prone to explosion or crystallization.

The pressure within each zone is sufficient to prevent air intake into the closed system (i.e., air cannot be drawn back into the closed system through the outlet). It is also important to maintain a relatively low pressure within each zone. In the practice of this invention, the pressure within each zone is generally maintained below about 30 psi, relative to atmospheric pressure. For the representative apparatus shown in FIGS. 2–9, the pressure is typically maintained below about 10 psi, preferably below about 5 psi. For the representative apparatus of FIGS. 10 and 11, the pressure is typically maintained between about 5 psi and 30 psi, and preferably between about 20 psi and 25 psi.

The initial zone temperatures are set based upon the initial composition of the aqueous stream. The vaporization zone is set to a temperature sufficient to vaporize most of the water within the aqueous stream at the selected pressure. Preferably, the vaporization temperature is sufficient to vaporize at least 90% of the water in the aqueous stream and, more preferably, it is sufficient to vaporize at least 95% of the water. In general, the vaporization temperature is maintained between about 90° C. and about 150° C. Preferably, the temperature is maintained between 95° C. and 130° C., and more preferably between 98° C. and 120° C. For pressures less than about 10 psi, the vaporization temperature is generally maintained at 90° C.–110° C., preferably at 98° C.–105° C., and more preferably at 100° C.–103° C. The vaporization temperature may be calculated by means known to those in the art, or may be determined using small-scale test reactions.

The refractory temperature is initially set by the most refractile DPC. For organic DPCs, the most refractile DPC is the compound with the highest thermal stability temperature. Table 1 above provides the thermal stability temperatures for representative organic DPCs which may be thermally decomposed in the practice of this invention. Thermal stability temperatures for additional compounds may be found in compilations known to those in the art including, for example, The Merck Index, Chemical Abstracts and Beilstein's Handbook. The refractory temperature for a material containing organic DPCs may be initially set to a temperature equal to, or slightly greater than, the highest thermal stability temperature for a DPC present in the material. Such a refractory temperature will generally range from a temperature in excess of the vaporization temperature up to a temperature just below the generation of a plasma, and typically below about 1500° C.

It has been found, in the practice of this invention, that temperatures significantly below the reported thermal stability temperatures are generally sufficient to thermally decompose organic DPCs. Accordingly, while the thermal stability temperatures provided in Table 1 and reported elsewhere are generally sufficient for treatment of organic DPCs, the initial refractory temperature may be set at a value that is considerably lower. In most cases, a refractory temperature that is 50–60% of the reported thermal stability temperature will thermally decompose an organic DPC by the method of this invention. For organic DPCs, the refractory temperature generally ranges from about 230° C. to about 700° C., typically from about 260° C. to about 650° C., and more typically from about 300° C. to about 550° C.

For heavy metal DPCs, the initial refractory temperature may be set within a range shown to be generally effective for the separation of metals. Most metals may be separated from chelating agents at temperatures sufficient to thermally decompose the organic chelating agent. In general, an appropriate refractory temperature for chelated metals ranges from about 150° C. to about 700° C., preferably from about 200° C. to about 550° C. and more preferably from about 250° C. to about 400° C. Many metals will also form deposits (or plate) at those temperatures, allowing separation of the metals from the remainder of the material in the aqueous stream. Similarly, inorganic complexes may generally be treated at temperatures ranging from about 150° C. to about 700° C., preferably from about 200° C. to about 550° C. and more preferably from about 250° C. to about 400° C. For complex mixtures of DPCs, however, refractory temperatures outside the common values identified above may be employed. Small scale test reactions may be performed in the laboratory to determine an appropriate refractory temperature for a given DPC mixture.

After establishing the initial vaporization and refractory temperatures, it is then necessary to determine whether the aqueous stream may be heated to those temperatures without adverse reactions. Adverse reactions include those reactions that may be difficult to control, such as explosive reactions, as well as precipitation, including crystallization. The tendency of a DPC to undergo an explosive reaction at the vaporization and refractory temperatures may be evaluated using the known properties of explosivity, reactivity and exothermic reaction potential. Small-scale test reactions may also be performed in a bomb test to evaluate the likelihood of explosion and crystallization at these temperatures.

If the aqueous stream is not suitable for vaporization (e.g., if one or more DPCs may explode when subjected to the vaporization temperature), the aqueous stream may be rendered suitable for vaporization by using various physical or chemical modifications. For example, further dilution of the DPCs with water may allow heating to the vaporization temperature without adverse reactions. Similarly, reaction with an oxidizing or reducing agent may sufficiently modify a DPC such that it can be subjected to the vaporization temperature without incident. The next step is to determine whether the aqueous stream can be heated from the vaporization temperature directly to the initial refractory temperature without adverse reactions. If the aqueous stream can be heated directly to the initial refractory temperature without adverse reactions, the determination of the initial zone temperatures is complete. On the other hand, if direct heating of the aqueous stream to the refractory temperature results in adverse reactions, such adverse reactions may be alleviated by further dilution of the DPCs with water, or by reacting the problematic DPC with an oxidizing or reducing agent.

In a preferred embodiment, such adverse reactions may also be avoided by subjecting the aqueous stream to one or more intermediate temperatures prior to subjecting it to the refractory temperature. Intermediate temperatures are temperatures between 90° C. and the refractory temperature. Appropriate intermediate zone temperature(s) are the temperature(s) at which the problematic DPC(s) can decomposed to one or more intermediate products that do not result in adverse reactions upon subsequent elevation to the refractory temperature. Such temperatures may be determined using small-scale test reactions.

For DPCs that are prone to explosive reactions or precipitation, one or more intermediate temperatures are preferably selected such that the aqueous stream is maintained under wet steam conditions (i.e., the water within the aqueous stream is partially vaporized such that both liquid and vaporized water are present). It has been found that treatment in the presence of both liquid water and steam results in partial decomposition of a potentially explosive organic DPC, such that the DPC may be subsequently treated without incident. In addition, for DPCs that may precipitate during treatment, the use of one or more such intermediate zone temperatures permits sufficient modification of the DPC in the presence of liquid water to prevent the formation of crystals. An appropriate temperature for achieving wet steam conditions will depend upon the composition of the aqueous stream and the pressure within the zone. In general, at pressures close to atmospheric pressure, an intermediate temperature between about 90° C. and 99° C. may be employed. At pressures near 30 psi, an appropriate intermediate temperature is generally between about 110° C. and 118° C.

The number of intermediate temperatures that may be employed ranges from one to a large number, such as 10. However, in the practice of this invention, it has been found that an apparatus having three zones that may be set at intermediate temperatures is generally sufficient to handle the most common DPCs present in materials that present disposal problems. If the use of an intermediate temperature is necessary, and an "unused" intermediate zone of the apparatus is available, that intermediate zone may be set to an appropriate intermediate temperature. When the use of a single intermediate zone temperature permits the subsequent heating of the aqueous stream to the refractory temperature without adverse reactions, the initial zone temperatures have been determined. If a single intermediate temperature is not sufficient, additional intermediate zones may be employed in the manner described above until all available intermediate zones in a given apparatus are utilized. If additional intermediate zone temperatures are necessary to avoid adverse reactions at the refractory temperature, an apparatus having additional intermediate zones may be utilized for treating the material.

FIG. 1A presents a flow chart of the various steps employed in determining the initial zone temperatures discussed above. Referring to FIG. 1A, in step 1 the temperature (between 90° C. to 150° C.) necessary to vaporize most of the water within the aqueous stream is initially determined. In step 2, the aqueous stream is evaluated to determine whether the DPCs contained therein may be vaporized at the initial vaporization temperature determined in step 1 without adverse reactions. If the answer is yes, then in step 3 the initial refractory temperature is determined as described above. In step 4, the aqueous stream is then evaluated to determine whether the DPCs contained therein may be subjected to the refractory temperature determined in step 3 without adverse reactions. If so, then the initial vaporization and refractory zone temperatures are determined, as represented by step 5.

If, in step 2 of FIG. 1A, the aqueous stream cannot be vaporized at the initial vaporization temperature without adverse reaction, then in step 6 the aqueous stream is examined to determine whether the DPCs can be physically or chemically altered so that the aqueous stream may be subjected to the initial vaporization temperature. If so, then such physical or chemical modifications are made in step 7. The vaporization temperature is then redetermined for the modified aqueous stream as in step 1. If the DPCs within the aqueous stream cannot be altered to allow heating of the stream to the vaporization temperature, then the aqueous stream is not suitable for treatment by the present invention, as represented by step 8.

Similarly, if in step 4 of FIG. 1A, subjecting the aqueous stream to the refractory temperature will result in adverse reactions, then in step 9 the aqueous stream is evaluated to determine whether the DPCs can be partially decomposed at one or more intermediate temperatures to yield decomposition intermediates that can be subjected to the initial refractory temperature. If this is the case, then in step 10 an intermediate zone temperature is set and the initial refractory temperature of step 3 is set based upon the decomposition intermediates now present in the aqueous stream. Steps 3, 4, 9 and 10 are repeated until the requisite number of intermediate zone temperatures have been set such that the aqueous material may subjected to the initial refractory temperature. If the DPCs cannot be partially decomposed at one or more intermediate temperatures to yield decomposition intermediates that can be subjected to the initial refractory temperature, it may be possible to dilute or otherwise modify the aqueous stream to allow heating to the refractory temperature (not shown). If not, then the aqueous stream is not suitable for thermal decomposition by this method, as again represented by step 8.

In addition to pressure and temperature, the flow rate of the aqueous stream through the system is controlled. Flow rate (i.e., the quantity of the aqueous stream allowed to enter and pass through the apparatus per unit time) may be regulated by a metered pump or by a valve located at or near the inlet of the apparatus. A typical flow rate for this method is 6 to 7 L/min. or more. For the representative apparatus of FIGS. 2–9, flow rates generally range from about 0.25 L/min. to about 5 L/min., and preferably from about 0.5 L/min. to about 2 L/min. For the apparatus of FIGS. 10 and 11, the flow rate generally ranges from about 1 L/min. to about 25 L/min., preferably from about 2 L/min. to about 10 L/min. It will be apparent to those skilled in the art that higher flow rates may be employed in an apparatus that is designed with larger zone volumes.

The flow rate is initially set to maintain a dwell time that is a default value specific for the apparatus. The dwell time in each zone should be sufficient to allow heating of the aqueous stream to the initial zone temperatures and, accordingly, will vary depending on the size of the apparatus (i.e., increasing the length or the internal diameter of the zones will permit the use of a higher flow rate without altering the dwell time). For the representative apparatus of FIGS. 2–9, the total dwell time within the apparatus generally ranges from 0.5 to 5 seconds, and is preferably about 1 second (i.e., about 0.7 seconds in the vaporization and intermediate zones and 0.3 seconds in the refractory zone). When working with a larger or smaller apparatus for which a default value has not been determined, one skilled in the art could readily determine an appropriate flow rate by analyzing the aqueous stream after it passes through the apparatus. If treatment is not sufficient, the flow rate can be decreased, thereby increasing the dwell time within the apparatus.

After the initial treatment parameters are determined by the procedures identified above, greater efficiency may be achieved by optimization of these parameters. In this context, optimization refers to modifying the treatment parameters to improve efficiency of the treatment process by lowering one or more of the zone temperatures (preferably the refractory zone temperature), by decreasing one or more dwell times (thus increasing the rate at which the aqueous stream is thermally decomposed), or by a combination of the two.

Optimization may be achieved using a balancing process in which modifications of one parameter are offset by changes to another parameter. For example, a decrease in flow rate may permit a decrease in one or more zone temperatures without adversely affecting treatment. Changes in the composition of the aqueous stream may also affect the treatment process. To this end, further dilution of the DPCs may permit heating to higher temperatures and/or increasing the flow rate. Those skilled in the art will recognize that there are many procedures by which optimization may be achieved in the practice of this invention. For example, intermediate temperatures may be used to partially decompose the DPC with the highest thermal stability, such that the refractory temperature may be lowered. The selection of appropriate intermediate temperatures for this purpose may be achieved by the procedures described above.

Figure 1B:
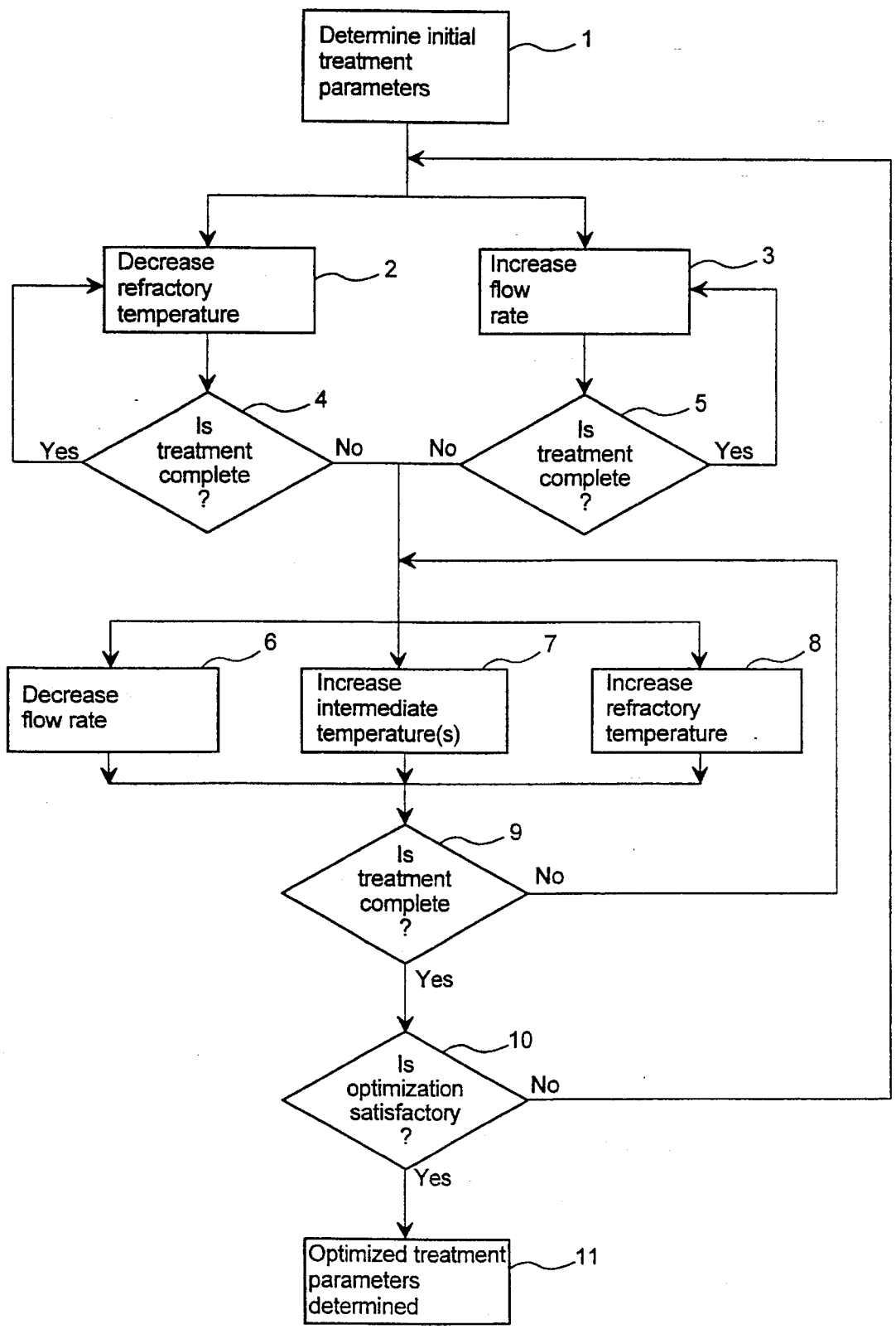
FIG. 1B is a flow diagram of a representative procedure for optimizing the initial treatment parameters.

The initial treatment parameters are preferably optimized by experimental refinement. A representative procedure for such optimization is provided in FIG. 1B. Referring to FIG. 1B, determination of the initial treatment parameters by procedures disclosed above is represented by step 1. The first adjustment to the initial treatment parameters may be made to either a zone temperature, preferably the refractory temperature, or to the flow rate. If the optimization is aimed at reducing heating requirements, the first trial adjustment is preferably a lowering of the refractory zone temperature, as indicated by step 2. Alternatively, if optimization is aimed at increasing the rate at which the aqueous stream is processed, the first trial adjustment is preferably an increase in flow rate, as represented by step 3.

After the first trial adjustment is made, a portion of the aqueous stream should be subjected to the new parameters and the effluent analyzed by appropriate analytical techniques, such as the techniques described above for analyzing the material prior to treatment. If treatment is complete, as represented by steps 4 and 5, further modification may be made to the refractory temperature and/or the flow rate of steps 2 and 3, respectively. Modification of the treatment parameters may continue until analysis of the effluent shows that treatment has fallen below acceptable or desired limits. At this point in the optimization process, the flow rate should be decreased and/or the refractory temperature or one or more intermediate temperatures should be increased, as represented by steps 6, 7 and 8, respectively. The choice of parameter (or parameters) to modify will again depend upon the goal of the optimization. Such modifications may be made (i.e., steps 6, 7 and/or 8 may be repeated) until analysis of the effluent again shows that treatment is at acceptable or desired levels, as shown in step 9. At this point, if sufficient optimization has been achieved, step 10, then the optimized treatment parameters have been determined as represented in step 11. If, in step 10, sufficient optimization has not been achieved, then steps 2 through 10 may be repeated until the desired level of optimization is achieved.

In the course of optimization, particularly in a two-zone system where the refractory zone temperature is significantly higher than the vaporization zone temperature, it may be useful to employ a preparation temperature for the purpose of heating the aqueous stream to a temperature between the vaporization temperature and the refractory temperature. Such a preparation temperature is not utilized to treat the DPCs within the aqueous stream, but rather to make the refractory zone more efficient by introducing the aqueous stream into the refractory zone at a higher temperature than the vaporization temperature.

After the treatment parameters have been initially set, and in a preferred embodiment optimized, treatment of the material may proceed. Flow of the aqueous stream through the apparatus is achieved using any means known to those skilled in the art, preferably using a metered pump. Alternatively, flow may be achieved using other means that maintain an appropriate head pressure, sufficient to prevent oxygen intake into the closed system. The head pressure for the representative apparatus of FIGS. 2–9 will generally range from about 5 psi to about 20 psi, and preferably from about 7 psi to about 15 psi relative to atmospheric pressure. For the representative apparatus of FIGS. 10 and 11, an appropriate head pressure ranges from about 10 psi to about 60 psi, preferably from about 20 psi to about 40 psi, and more preferably the head pressure is about 30 psi. Sufficient head pressure may be achieved using pressurized nitrogen ($N_2$). Alternatively, for low system pressures, the aqueous stream may be maintained at a sufficient height above the inlet of the apparatus to generate the desired head pressure by gravity alone.

The aqueous stream is then introduced into the vaporization zone of the apparatus through the vaporization zone inlet. The vaporization zone is heated by an external source to the predetermined vaporization temperature, which is sufficient to vaporize most of the water in the aqueous stream. Upon exiting the vaporization zone, the aqueous stream may proceed directly to the refractory zone if the treatment parameters do not include intermediate temperatures. Alternatively, the aqueous stream may pass through the intermediate zones of the apparatus, maintained at a temperature sufficient to preserve the vaporized state of the aqueous stream prior to entering the refractory zone. The refractory zone is similarly heated by an external source to the predetermined refractory temperature.

When the treatment parameters include heating to one or more intermediate temperatures, the aqueous stream is directed into an intermediate zone after vaporization and prior to entry into the refractory zone. If only one intermediate temperature is used, an intermediate zone is maintained at the predetermined intermediate temperature. Other unused intermediate zones within the apparatus may be maintained at a temperature sufficient to maintain the vaporized state of the aqueous stream. If more than one intermediate temperature is used, the aqueous stream is generally subjected first to the lowest intermediate temperature. The aqueous stream then passes from the first intermediate zone to the subsequent intermediate zone or zones, which are maintained at the intermediate temperatures established as the treatment parameters. As discussed above, the final intermediate zone may also be maintained at an elevated preparation temperature. Following exposure to all intermediate and/or preparation temperatures, the aqueous stream is directed into the refractory zone.

After passing through and exiting the refractory zone through the refractory zone outlet, the aqueous stream is preferably condensed using one or more condensers. Preferably, condensation is achieved by passing the treated aqueous stream through two condensers in series. In such a two-condenser embodiment, the first condenser may be maintained at a slightly elevated temperature relative to the second condenser. The precise temperature that is suitable for the first condenser will depend upon the compounds being condensed and (as discussed above) the desired system pressure but, in general, a temperature ranging from about 60° C. to about 65° C. is sufficient. If the temperature of the first condenser is used to control system pressure, this condenser should be a part of the closed system (i.e., no oxygen is allowed to enter the condenser). The second condenser may then be maintained at a lower temperature sufficient to cool the aqueous stream to an ambient discharge temperature.

To monitor the treatment process, small test aliquots of the aqueous stream are preferably analyzed. As discussed above, the appropriate method for analysis will depend upon the composition of the material. In general, the analysis should detect any residual DPCs, as well as likely decomposition products. Suitable methods for analysis include those methods discussed above for analyzing the untreated material. Preferably, the test aliquots are withdrawn between the first and second condenser.

With regard to the apparatus of the present invention, the apparatus generally comprises the following components: a vaporization zone inlet, a closed system with at least two separately heated zones (i.e., the vaporization zone and the refractory zone), a refractory zone outlet, and one or more optional condensers. The apparatus also includes a means for controlling flow rate of the aqueous stream through the closed system. In addition, the apparatus may be equipped to monitor the temperature within the zones, and the pressure at various locations within the apparatus.

The inlet of the apparatus is an opening through which the aqueous stream enters the vaporization zone of the closed system. Optionally, the inlet may also contain an injection port for injecting material into the aqueous stream prior to entry of the same into the closed system. The injection port may be any one of those known in the art to be suitable for injecting solids, liquids or gases in reproducible amounts. Suitable injection ports include metered pumps and restriction valves. In addition, the inlet preferably prevents back flow of the aqueous stream by, for example, utilizing a one-way or check value.

The closed system may be constructed using materials known to those in the art that will withstand the temperatures and pressures employed in the present method. Suitable materials include, by way of example, stainless steel, INKONAL™, nickel and titanium. The separate zones and/or components of the closed system may be joined by any means which will prevent leakage of the aqueous stream and intake of oxygen, including welded flanges. The shape of the flow path of the aqueous stream through the closed system is important for treatment efficiency. To ensure rapid heating of the aqueous stream in each of the zones, the flow path should be designed to promote turbulence in the aqueous stream. For example, laminar flow may be inhibited in the apparatus by inserting corners in the flow path of the aqueous stream.

The relative volumes of the various zones of the apparatus are also important for controlling the pressure within each of the zones. As the aqueous stream is heated to higher temperatures, the pressure within the closed system will increase if the zone volume remains unchanged. Accordingly, in a preferred embodiment having at least one intermediate zone, an increase in zone volume of at least two-fold, and preferably at least four-fold, takes place within the zones that are upstream of the refractory zone. In other words, the volume of the zone immediately upstream of the refractory zone is at least two times, and preferably four times, that of the vaporization zone.

Optionally, the aqueous stream may be filtered, either prior to entry into the closed system or at any point within the closed system. Filtering may be desirable when the aqueous stream contains solid components sufficiently large to impede flow through the apparatus. Any appropriate filtering device known to those in the art may be utilized for this purpose. Preferably, the filter is a Y-type filter. The mesh size of the filter will depend upon the size of the particles to be removed from the aqueous stream, and should be sufficient to remove particles which could clog the apparatus. In general, an 80 mesh filter is sufficient.

The outlet is the portion of the apparatus between the refractory zone and the condenser or condensers. The diameter of the outlet is determined by the flow rate of the aqueous stream and the cooling capacity of the downstream condenser or condensers. The outlet is preferably constructed with one or more right angle turns so that laminar flow is inhibited. The outlet is then connected to the entrance of the first condenser.

The various temperature zones may be heated using a variety of external heating devices known to those in the art, including resistance heaters (such as CALRODS™), cuff heaters, heating tape and steam. The use of steam and/or resistance heaters is preferred. Significant disadvantages (such as the lack of precise temperature control) are associated with the use of internal heating devices and, accordingly, the use of such devices is not preferred. The zone temperatures may be regulated using commercially available temperature controllers. Recycled heat may also be utilized, particularly for heating the vaporization and intermediate zones.

Temperature may be sensed within the zones by any appropriate sensor known to those in the art that is accurate within the desired range, and will not react chemically with the aqueous stream. The use of commercially available thermocouples is preferred. Optionally, pressure may also be measured at various points throughout the apparatus. Pressure may be monitored using, for example, a commercially available pressure sensor.

The condenser portion of the apparatus may comprise one or more condensers known to those in the art to be suitable for condensing an aqueous stream at the temperature and flow rate of the stream exiting the refractory zone. As discussed above, the use of two condensers, where the first condenser is maintained at an elevated temperature and the second temperature is maintained at a temperature sufficient to cool the treated aqueous stream to ambient temperature, is preferred. In such systems, the portion of the apparatus between the condensers may contain a tap for withdrawing test aliquots at an elevated temperature for analysis. The apparatus may also contain a trap for gases downstream of the condensers, as well as a detection device for analysis of the effluent from the condenser. The detection device may be any of the devices known to those in the art for continuous or stop-flow analysis of the aqueous stream.

A representative embodiment of an apparatus of this invention is illustrated in FIGS. 2–9. FIG. 2A is a block diagram of a two-zone apparatus, while FIG. 2B is a block diagram of a five-zone apparatus. Referring to FIG. 2A, aqueous stream 200 enters vaporization zone 210 through flow control valve 205. Flow control valve 205 is controlled by flow indicator control 204 in communication with flow transmitter 202 which spans flow orifice 203. Pressure indicator 207 is located upstream of vaporization zone 210, and aqueous stream 200 enters vaporization zone 210 via inlet 208.

Vaporization zone 210 heats aqueous stream 200 by resistance heater 214 which is connected to silicon rectifier 213, and which communicates with temperature indicating controller 215 and temperature transmitter 218. Pressure indicator 217 is located upstream of refractory zone 220.

Refractory zone 220 similarly heats aqueous stream 200 by resistance heater 224 which is connected to silicon rectifier 223, and which communicates with temperature indicating controller 225 and temperature transmitter 228. Aqueous stream 200 exits refractory zone 220 via outlet 221.

Aqueous stream 200 then enters condenser 230 via condenser inlet 232 and exits via condenser outlet 233. Condenser cooling water 240 is supplied to condenser 230 and flows counter-current to aqueous stream 200 and exits the condenser as warmed cooling water 242. Temperature indicating controller 245 and temperature transmitter 246 communicate with temperature control valve 247 to control the amount of condenser cooling water 240 passing through condenser 230. After exiting condenser outlet 233, treated aqueous stream 250 is controlled by valve 251.

Figure 2A:
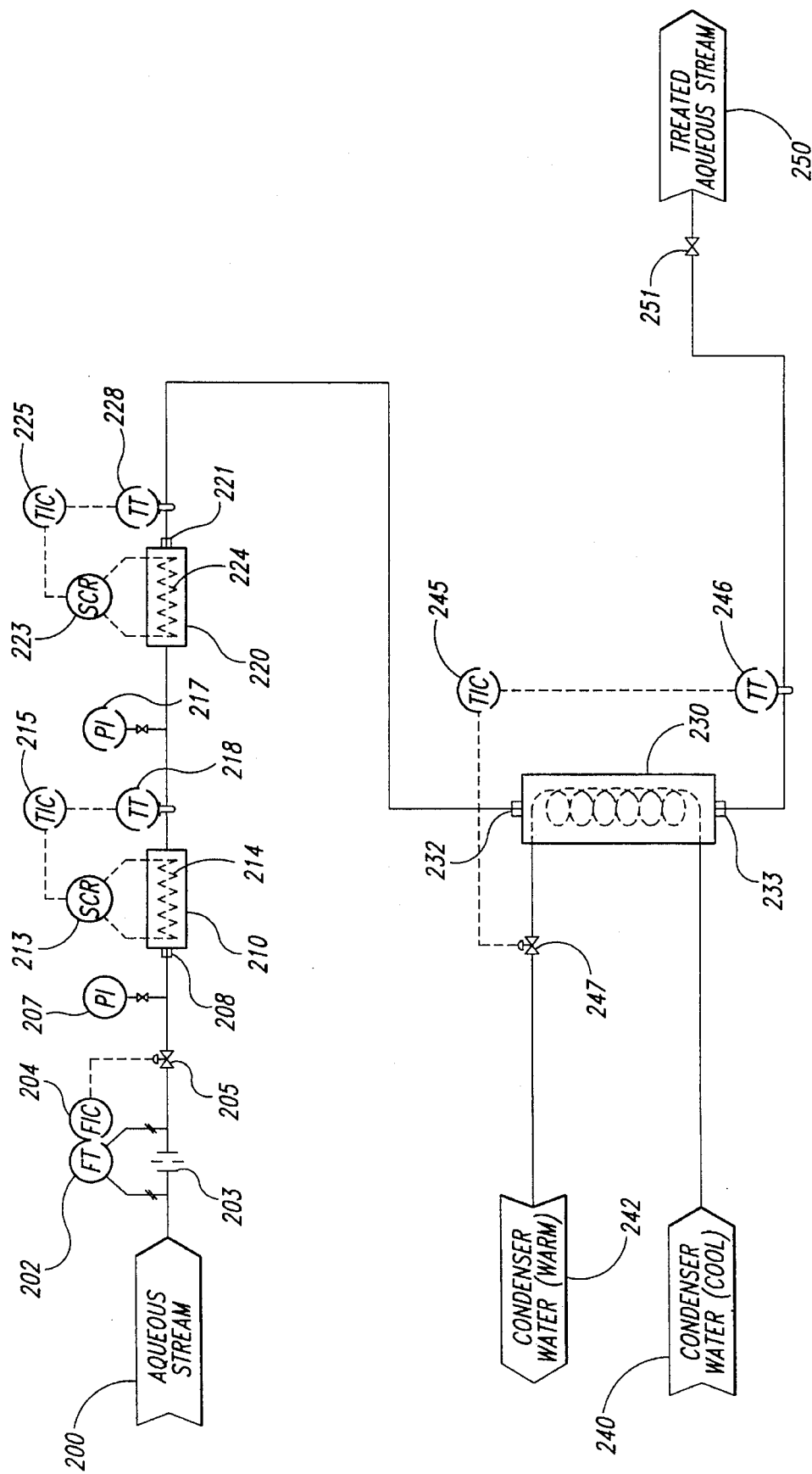
FIGS. 2A and 2B are block diagrams of a representative two-zone and five-zone apparatus, respectively, of the present invention.
Figure 2B:
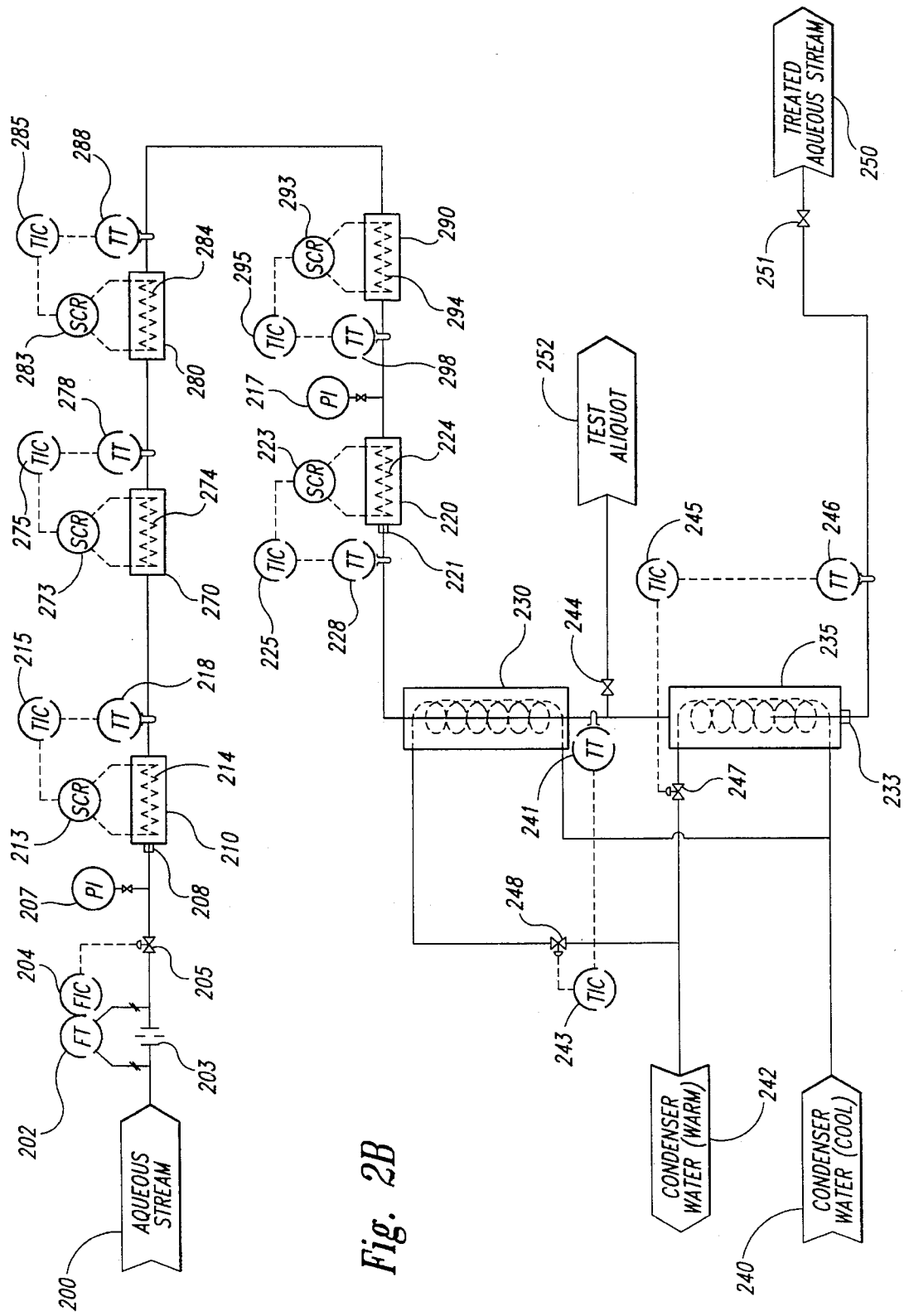

FIG. 2B illustrates a representative 5-zone apparatus of this invention. As with the apparatus of FIG. 2A, aqueous stream 200 enters vaporization zone 210 through flow control valve 205. Flow control valve 205 is controlled by flow indicator control 204 in communication with flow transmitter 202 which spans flow orifice 203. Pressure indicator 207 is located upstream of vaporization zone 210, and aqueous stream 200 enters vaporization zone 210 via inlet 208. Vaporization zone 210 and refactory zone 220 heat aqueous stream 200 by resistance heaters 214 and 224, which are connected to silicon rectifiers 213 and 223, and which communicate with temperature indicating controllers 215 and 225 and temperature transmitters 218 and 228, respectively. Pressure indicator 217 is located upstream of refractory zone 220. Aqueous stream 200 exits refractory zone 220 via outlet 221.

In addition to the vaporization and refractory zones discussed above, the 5-zone apparatus of FIG. 2B further contains three intermediate temperature zones in series. In particular, first intermediate zone 270, second intermediate zone 280, and third intermediate zone 290 heat aqueous stream 200 by resistance heaters 274, 284, and 294, respectively. Resistance heaters 274, 284 and 294 are connected to silicon rectifiers 273, 283, and 293, respectively, and communicate with temperature indicating controllers 275, 285, and 295, and with temperature transmitters 278, 288, and 298, respectively.

In further reference to FIG. 2B, two condensers (i.e., condensers 230 and 235) are provided. Condenser cooling water 240 flows through condensers 230 and 235 in a countercurrent flow to aqueous stream 200, and exits condensers 230 and 235 yielding warmed cooling condenser water 242. The flow rate of cooling condenser water 240 is controlled by temperature indicating controllers 243 and 245, temperature transmitters 241 and 246 and temperature control valves 247 and 248. In addition, a sample tap 244 is provided between condenser 230 and 235 for withdrawal of test aliquot 252 of aqueous stream 200 at an elevated temperature. After exiting condenser outlet 233, treated aqueous stream 250 is controlled by valve 251.

Figure 3:
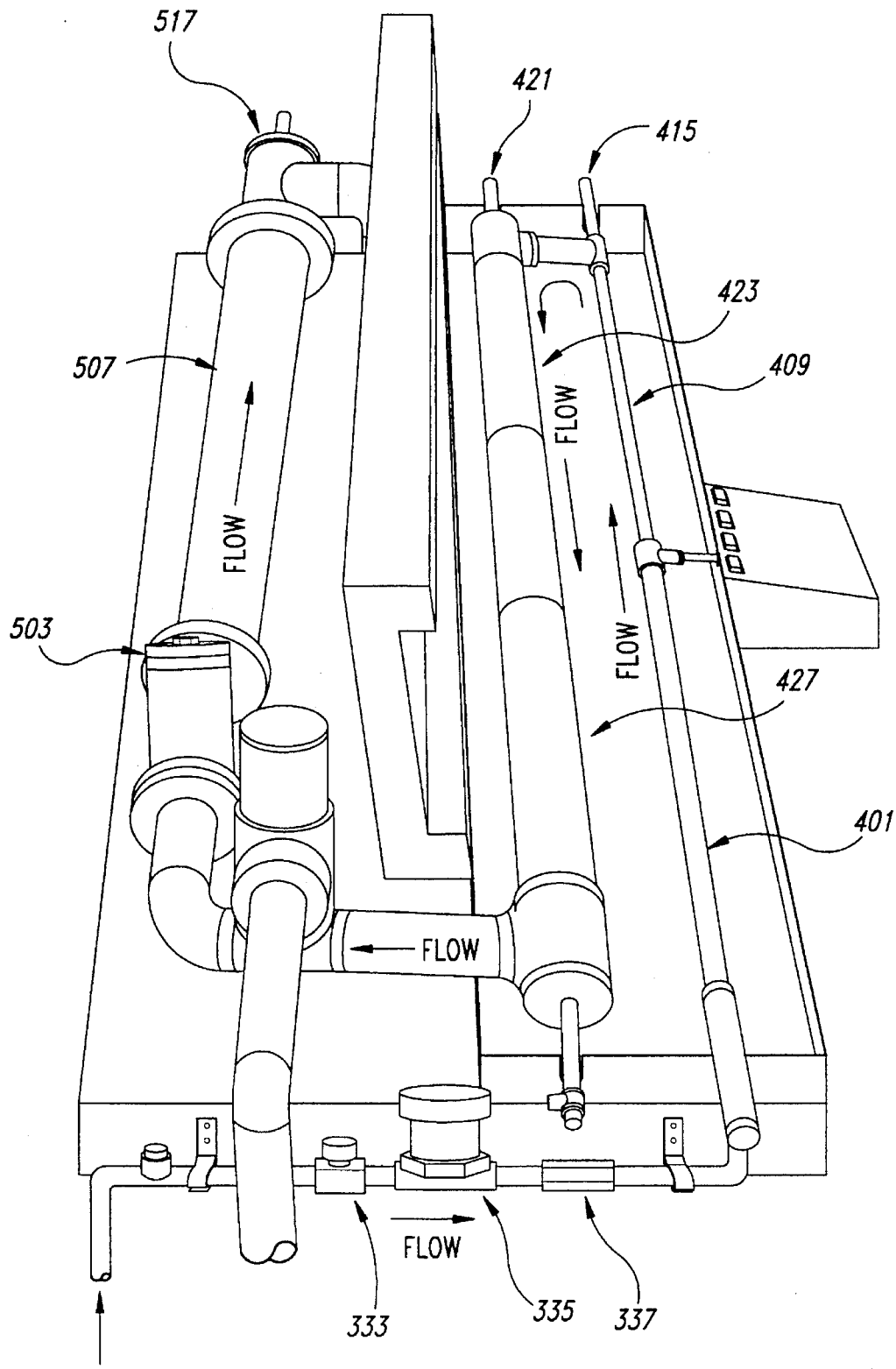
FIG. 3 is a photograph of a representative five-zone apparatus of this invention.

FIG. 3 is a photograph of a representative apparatus of this invention. The apparatus is provided with needle flow control valve 333, flow meter 335 and backflow check valve 337 upstream of vaporization zone 401. In this embodiment, the apparatus contains three intermediate zones, 409, 423 and 427, and pressure is monitored using pressure transmitter 415. The temperature between intermediate zones 409 and 423 is also monitored using thermocouple 421. The apparatus contains a Y-type filter 503 upstream of refractory zone 507. The temperature at the downstream end of the refractory zone is monitored using thermocouple 517.

Figure 4:
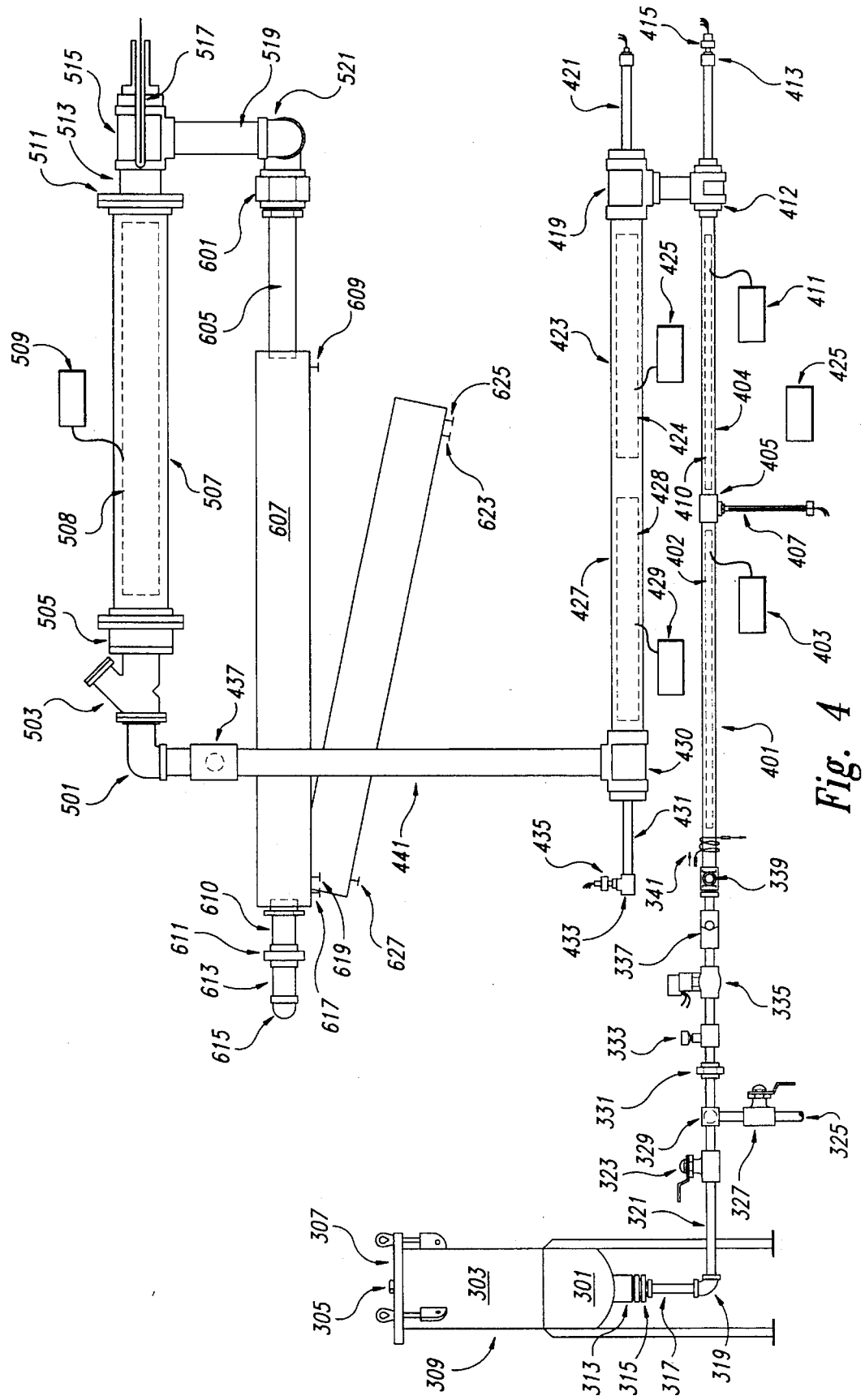
FIG. 4 is a schematic drawing of the apparatus of FIG. 4, including the condensers which are not visible in the photograph of FIG. 3.

FIG. 4 presents a more detailed schematic of the apparatus of FIG. 3, and further illustrates the two condensers (not shown in FIG. 3) and the reservoir that contains the material prior to treatment (also not shown in FIG. 3). A detailed treatment of the components identified in FIG. 4 is presented in FIGS. 5–9, which are discussed immediately below. For purpose of clarity, the reference numbers identified in FIGS. 5–9 are (to the extent possible) included in FIG. 4. Thus, when referring to FIGS. 5–9 below, reference should also be made to FIG. 4 and the corresponding reference numbers therein.

Figure 5A:
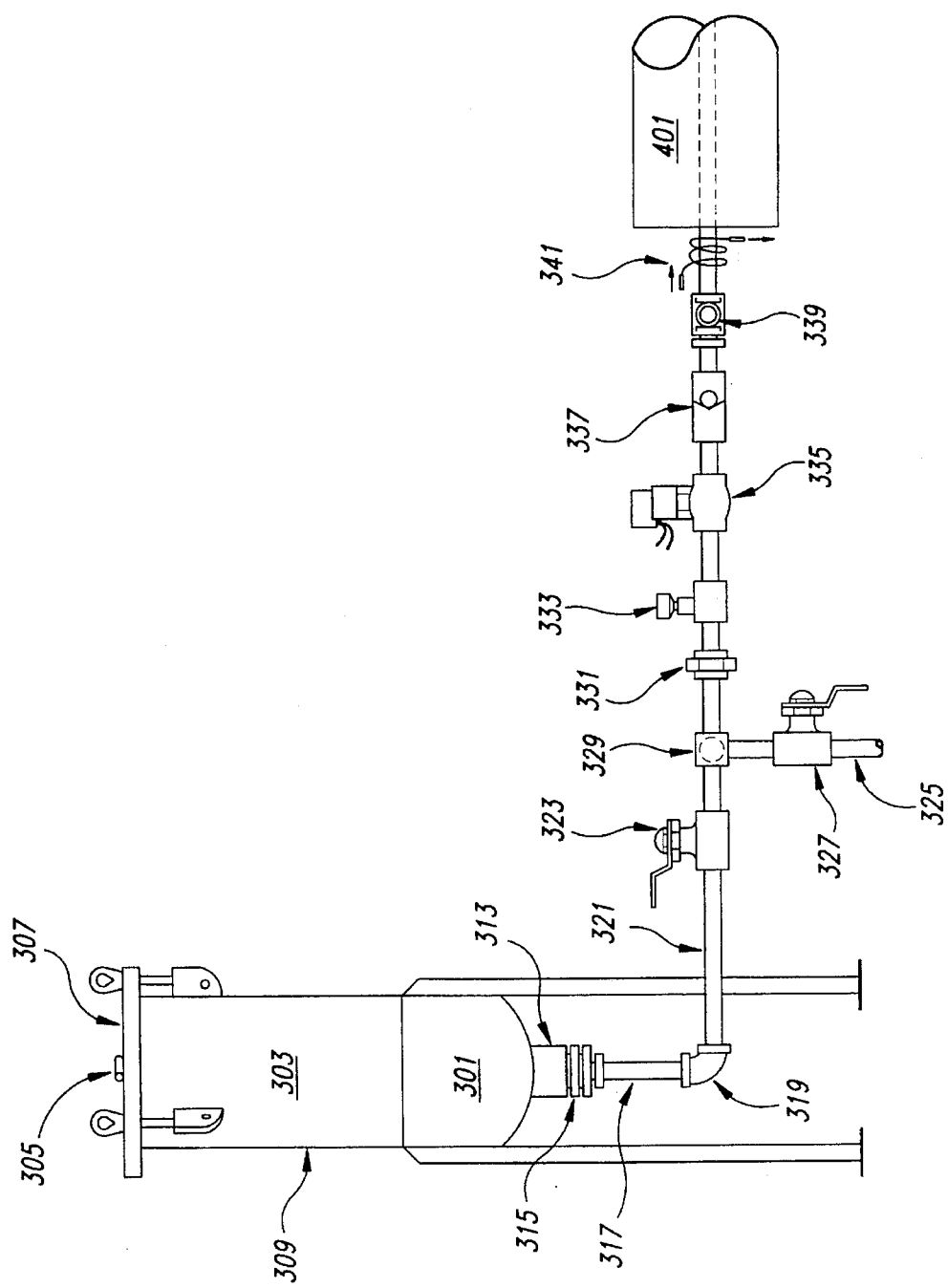
FIG. 5A illustrates a portion of the representative apparatus of FIG. 4 upstream of the vaporization zone.
Figure 5B:
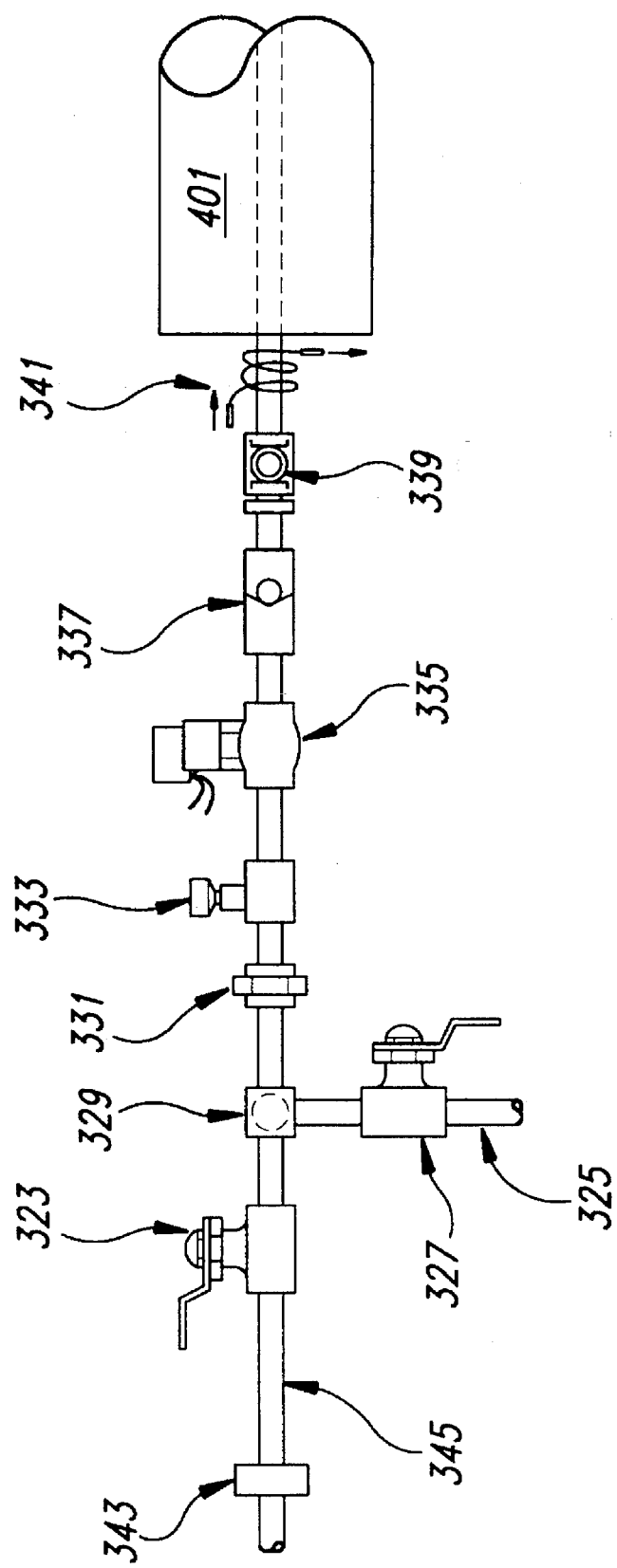
FIG. 5B illustrates an alternative embodiment of this portion of the apparatus.

FIG. 5A shows the portion of the apparatus upstream of the vaporization zone. Reservoir 309 is provided with cover 307 fitted with a nitrogen pressure hose 305. Nitrogen within the reservoir applies a head pressure to the material therein. Reservoir 309 contains an outlet 313 and is joined to line 317 by way of junction 315. Line 317 is connected to elbow 319 and line 321. Ball valve 323 controls the flow of the material prior to entry into the aqueous stream. At coupling 329, the material line is joined to a water supply line 325 by way of valve 327. The material and water supplies are joined to needle flow control valve 333 by way of union 331. The apparatus also includes flow meter 335 and backflow check valve 337. Prior to the vaporization zone, the apparatus contains a nitrogen purge port 339 and is cooled with cooling coil 341. An alternative embodiment of this portion of the apparatus is shown in FIG. 5B. In this embodiment, a gaseous material enters the apparatus through pressurized input 343 and line 345. The remainder of the components are as identified above in reference to FIG. 5A.

Figure 6:
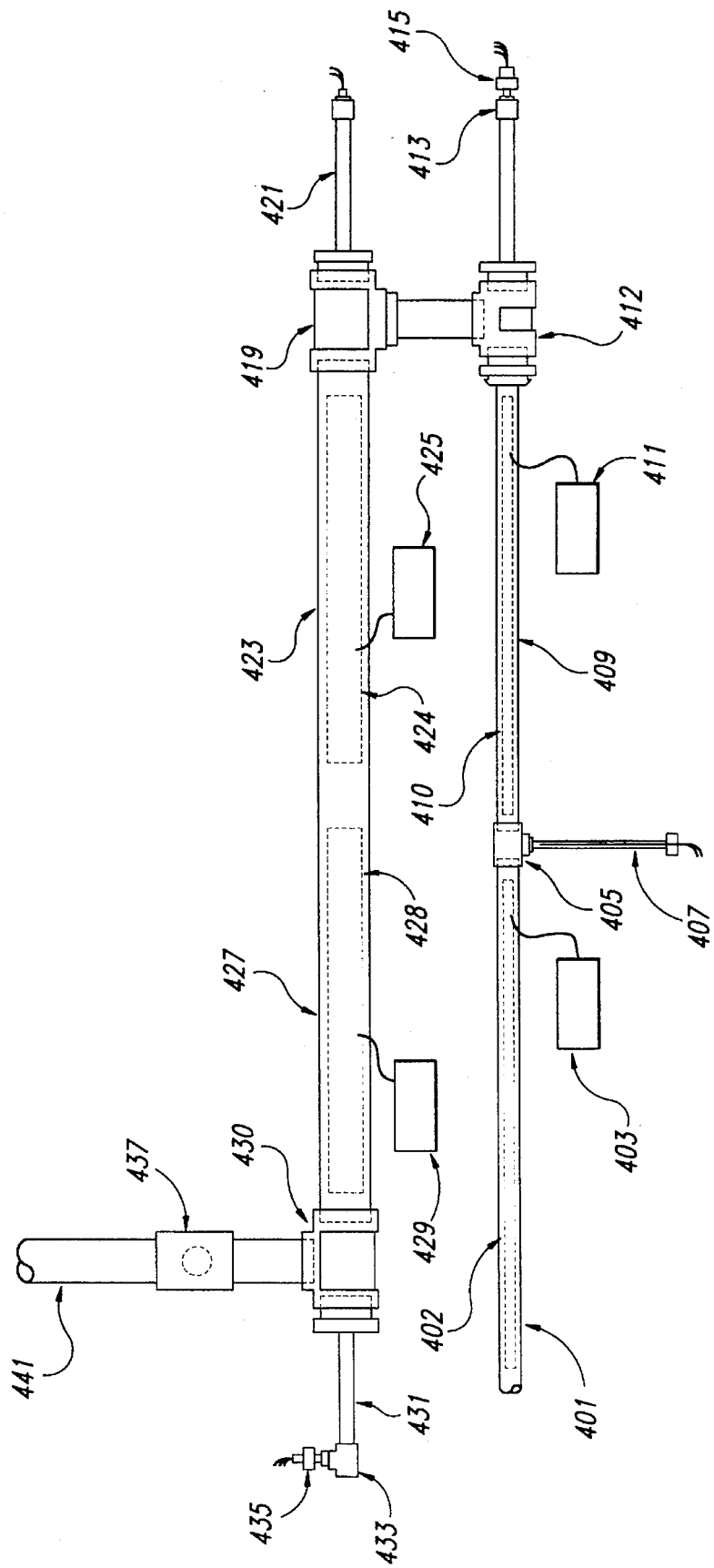
FIG. 6 illustrates a portion of the representative apparatus of FIG. 4 upstream of the refractory zone, including the vaporization zone and the first, second and third intermediate temperature zones.

FIG. 6 illustrates the portion of the apparatus upstream of the refractory zone. This portion of the apparatus contains vaporization zone 401, which is contained within a 1 inch diameter stainless steel pipe and is heated with the CAL-ROD™ resistance heater 402 and temperature controller 403. Temperature is monitored in the vaporization zone using thermocouple 407, which is inserted into vaporization zone 401 by way of tee 405. First intermediate zone 409 follows vaporization zone 401, and is also contained within the 1 inch diameter stainless steel pipe. The total length of the 1 inch diameter portion of the apparatus is 8 feet, approximately half of which is vaporization zone 401 and half of which is first intermediate zone 409. First intermediate zone 409 is heated with the CALROD™ resistance heater 410 and temperature controller 411. At tee 412, temperature is monitored using thermocouple 415 and at tee 419, pressure is monitored using pressure transmitter 421.

Second and third intermediate zones 423 and 427, respectively, are contained within 3 inch diameter stainless steel pipe. The total length of the 3 inch diameter portion of the apparatus is 8 feet, approximately half of which is second intermediate zone 423 and half of which is third intermediate zone 427. These zones are heated using CALROD™ resistance heaters 424 and 428. CALROD™ resistance heater 424 is controlled using temperature controller 425, and CALROD™ resistance heater 428 is controlled with temperature controller 429. At tee 430, temperature is monitored using thermocouple 431 and pressure is monitored using pressure transmitter 435. Pop-off valve 437 is located in line 441 which leads to the refractory zone and releases pressure if the internal pressure becomes too great (for example, in excess of 17 psi).

Figure 7A:
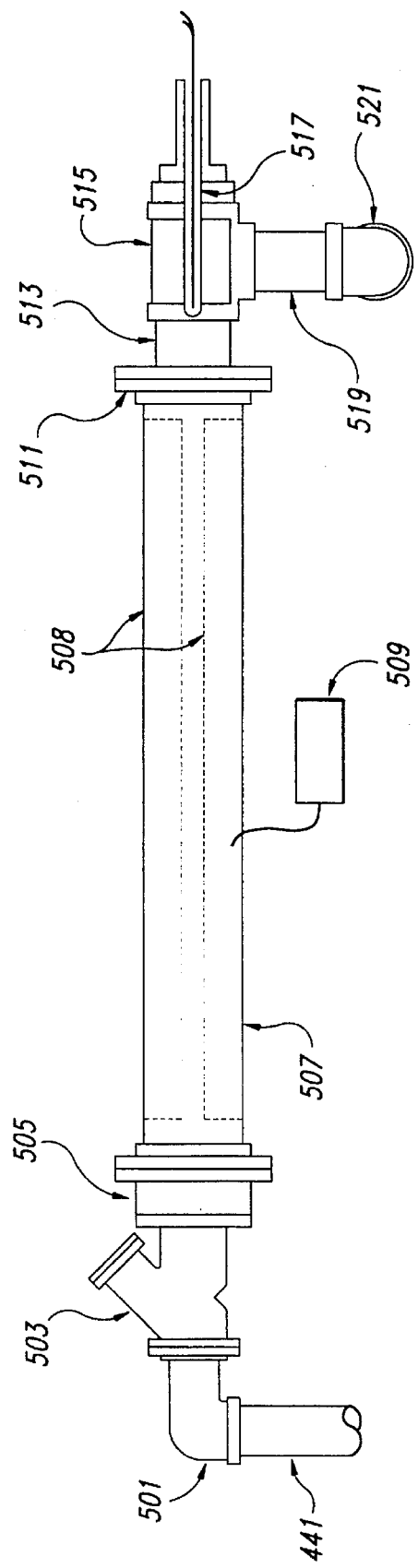
FIG. 7A illustrates the refractory zone of the representative apparatus of FIG. 4, and FIGS. 7B and 7C illustrate an alternative embodiment of the refractory zone.

FIG. 7A shows one embodiment of the refractory zone portion of the apparatus. Line 441 is connected to a Y-type strainer 503 by way of elbow 501. Y-type strainer 503 is joined to refractory zone 507 by way of a welded flange to INKONAL™ tube 505. Refractory zone 507 is contained within a 5 inch diameter stainless steel pipe measuring 57 inches in length. Refractory zone 507 is heated with high temperature cuff heaters 508 and regulated by temperature controller 509. Pipe flange 511 joins the refractory zone 507 to line 513 and coupling 515. Temperature is monitored using thermocouple 517. Line 519 leads to elbow 521.

An alternative embodiment of the refractory zone portion of the apparatus is illustrated in FIG. 7B. Line 441 is connected to elbow 501. Elbow 501 is joined to 5 inch diameter pipe 525 by way of a welded flange 504. Welded flange 527, which contains three holes through which the aqueous stream may pass, connects pipe 525 to refractory zone 529. Refractory zone 529 contains three separate 2 inch diameter INKONAL™ pipes, 530, 531 and 533, each measuring 57 inches in length. Each of the pipes 530, 531 and 533 is attached to flange 527 at one of the holes. The three pipes are heated together using high temperature cuff resistance heaters 533, 535 and 537, respectively. Pipe flange 541, which also contains three holes to which pipes 530, 531 and 533 are attached, joins the refractory zone 529 to line 513 and coupling 515. Temperature is monitored using thermocouple 517. Line 519 leads to elbow 521.

FIG. 7C shows a cross section of refractory zone 529 along flange 527. Welded flange 527 contains three separate holes of a diameter equal to the internal diameter of each of the three pipes 530, 531 and 533. The three pipes 530, 531 and 533 are welded to flange 527.

Figure 8:
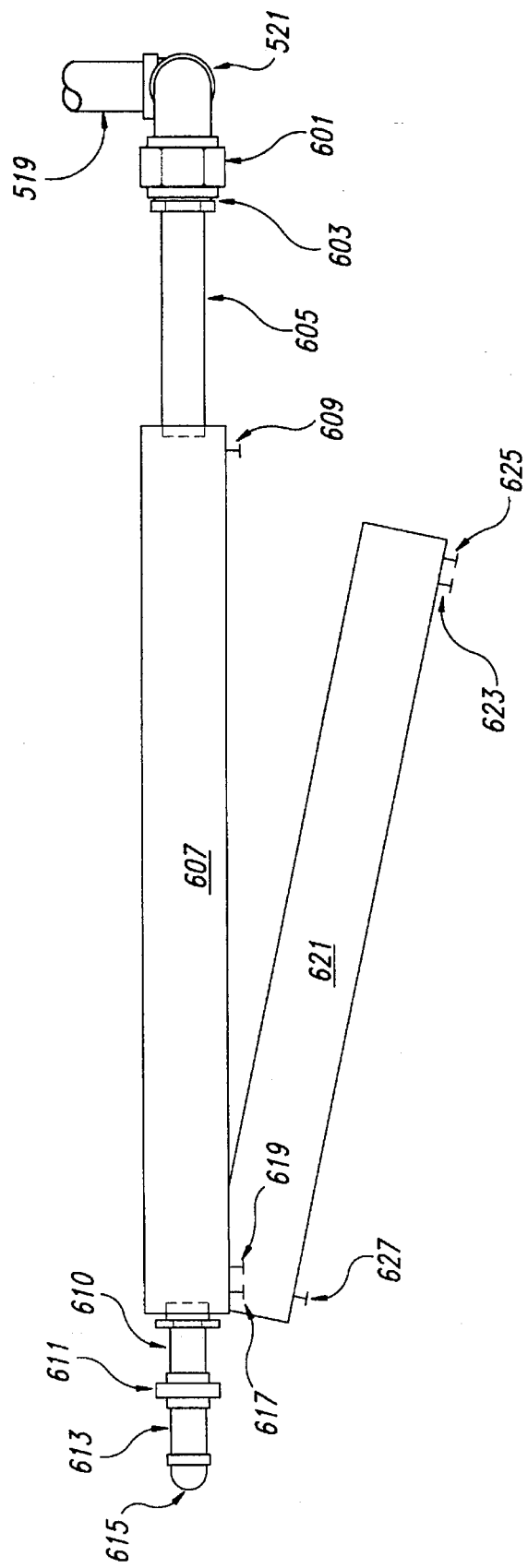
FIG. 8 illustrates the condenser located downstream of the refractory zone in the representative apparatus of FIG. 4.

The condensers of the apparatus of this invention are shown in FIG. 8. Elbow 521 is joined to line 605 by way of union 601 and reducer bushing 603. First condenser 607 has a cooling water inlet 609 and is joined at the downstream end to line 610. Condenser 607 also has a sample tap outlet 617 and a cooling water outlet 619. Downstream of line 610 is second condenser 621, joined to line 610 by way of union 611, line 613, and 90° elbow 615. Condenser 621 contains cooling water inlet 623, cooling water outlet 627, and condensate outlet 625.

Figure 9:
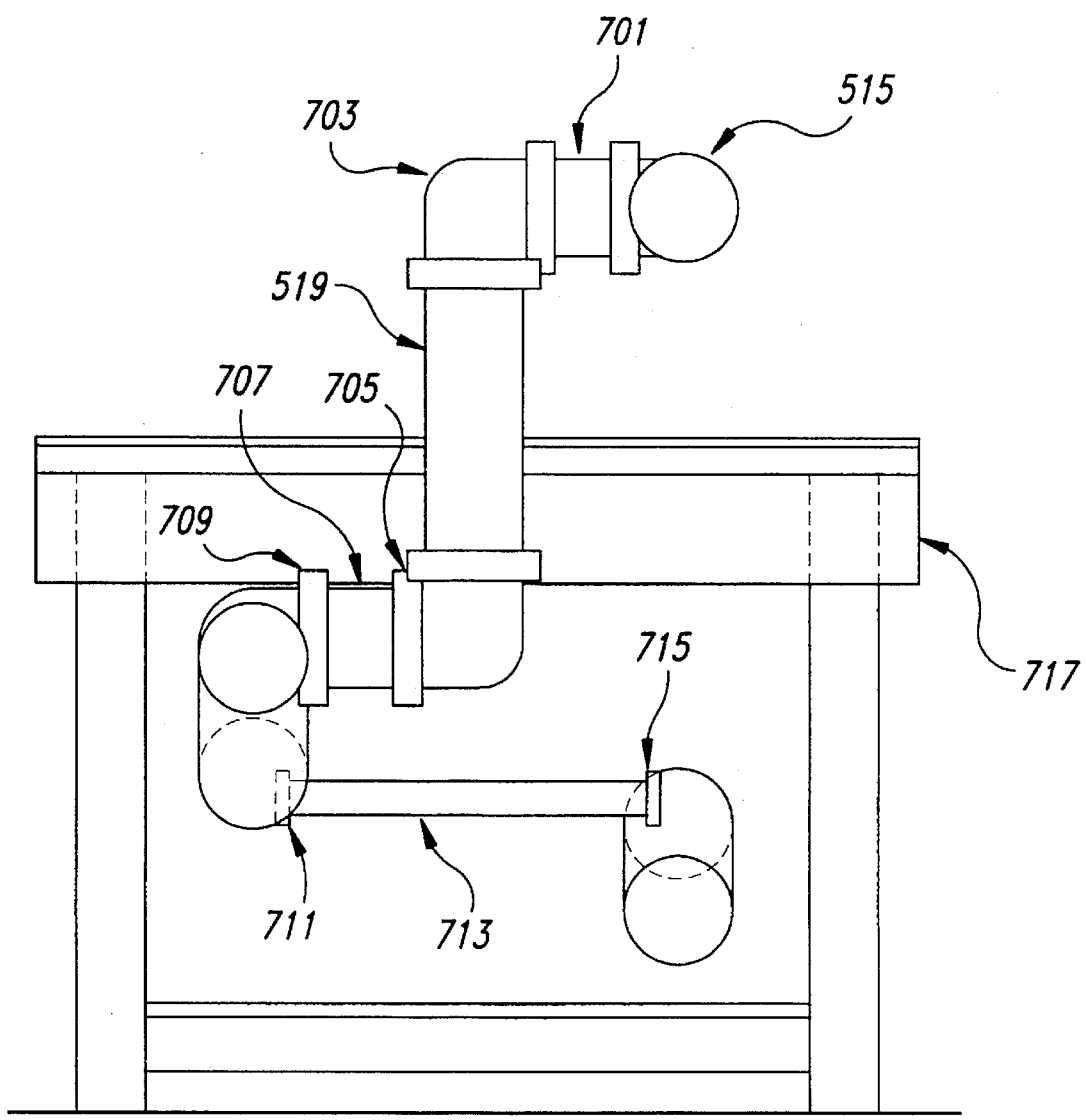
FIG. 9 illustrates the portion of the representative apparatus of FIG. 4 connecting the refractory zone to the first condenser.

FIG. 9 shows a side view of the portion of the apparatus between the refractory zone and the first condenser. Coupling 515 is joined to line 701, which in turn is joined to line 519 by way of 90° elbow 703. Line 519 is, in turn, joined to line 707 by way of 90° elbow 705. Two additional 90° elbows, 709 and 711, lead to line 713 which is joined to the condenser by way of 90° elbow 715. This portion of the apparatus directs the aqueous stream from the heated portions of the apparatus, located above table 717, to the cooled portions heated beneath the table.

An alternative representative embodiment of an apparatus of this invention, which operates at higher internal pressures, is illustrated in FIGS. 10 and 11. FIGS. 10A, 10B and 10C are block diagrams of the portion of the system upstream of the condensers, and FIGS. 10D and 10E are block diagrams of the condenser portion of the system. FIG. 10F is a legend identifying symbols employed in FIGS. 10A through 10E. FIGS. 11A through 11G illustrate a representative apparatus according to the block diagrams of FIG. 10.

Figure 10A:
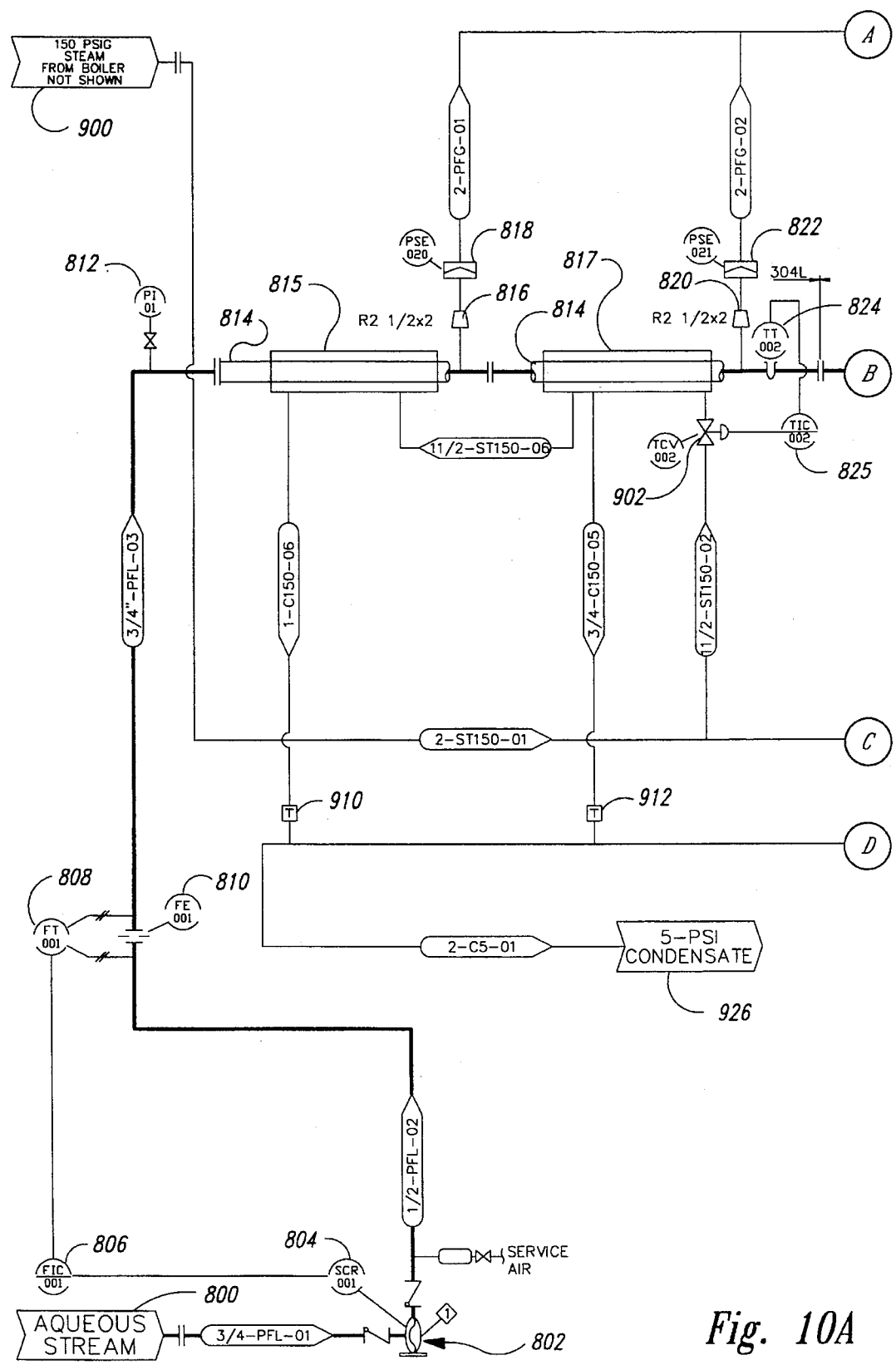
FIGS. 10A through 10E are block diagrams of an alternative representative five-zone apparatus of the present invention.
Figure 10B:
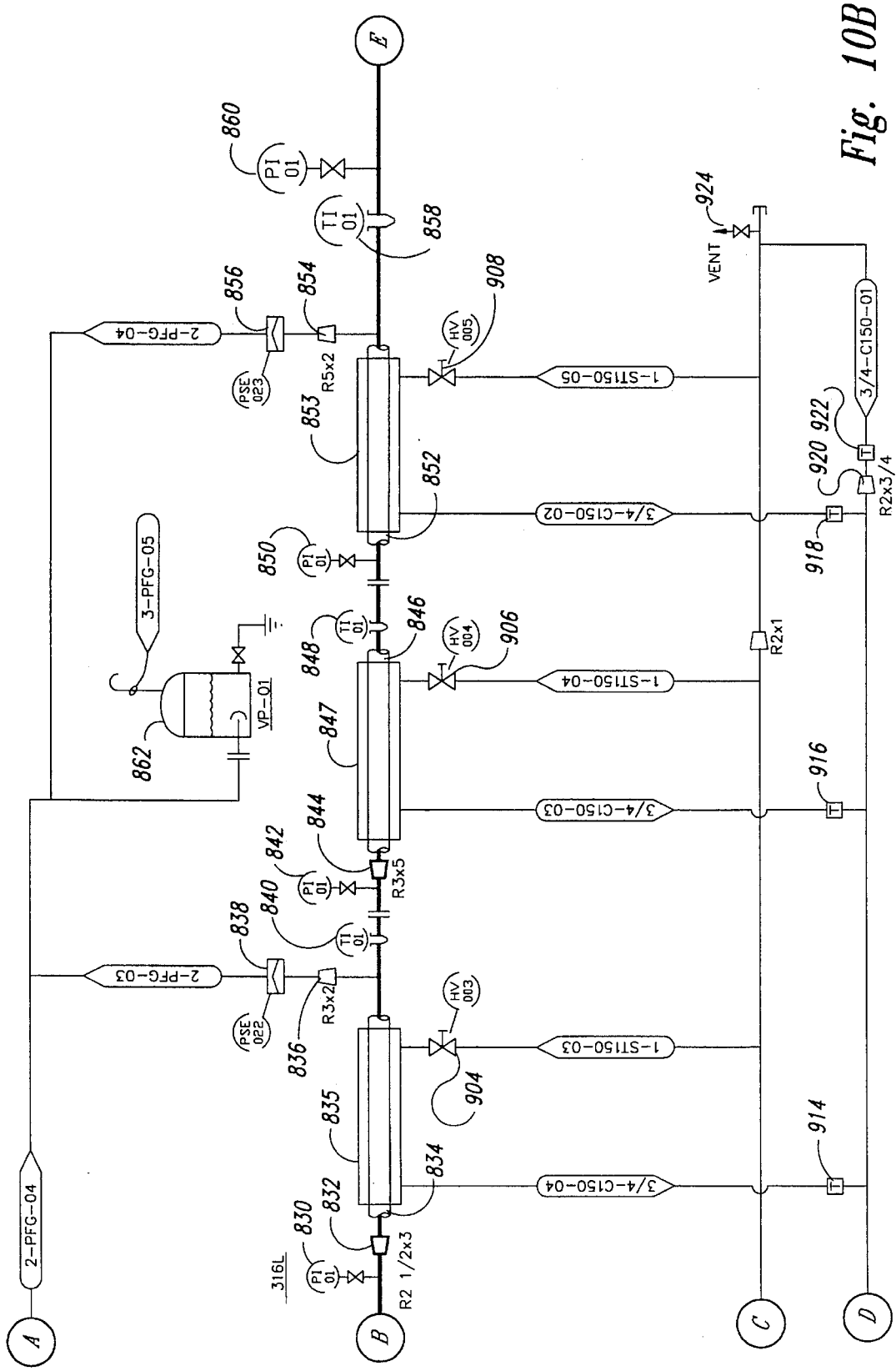
Figure 10C:
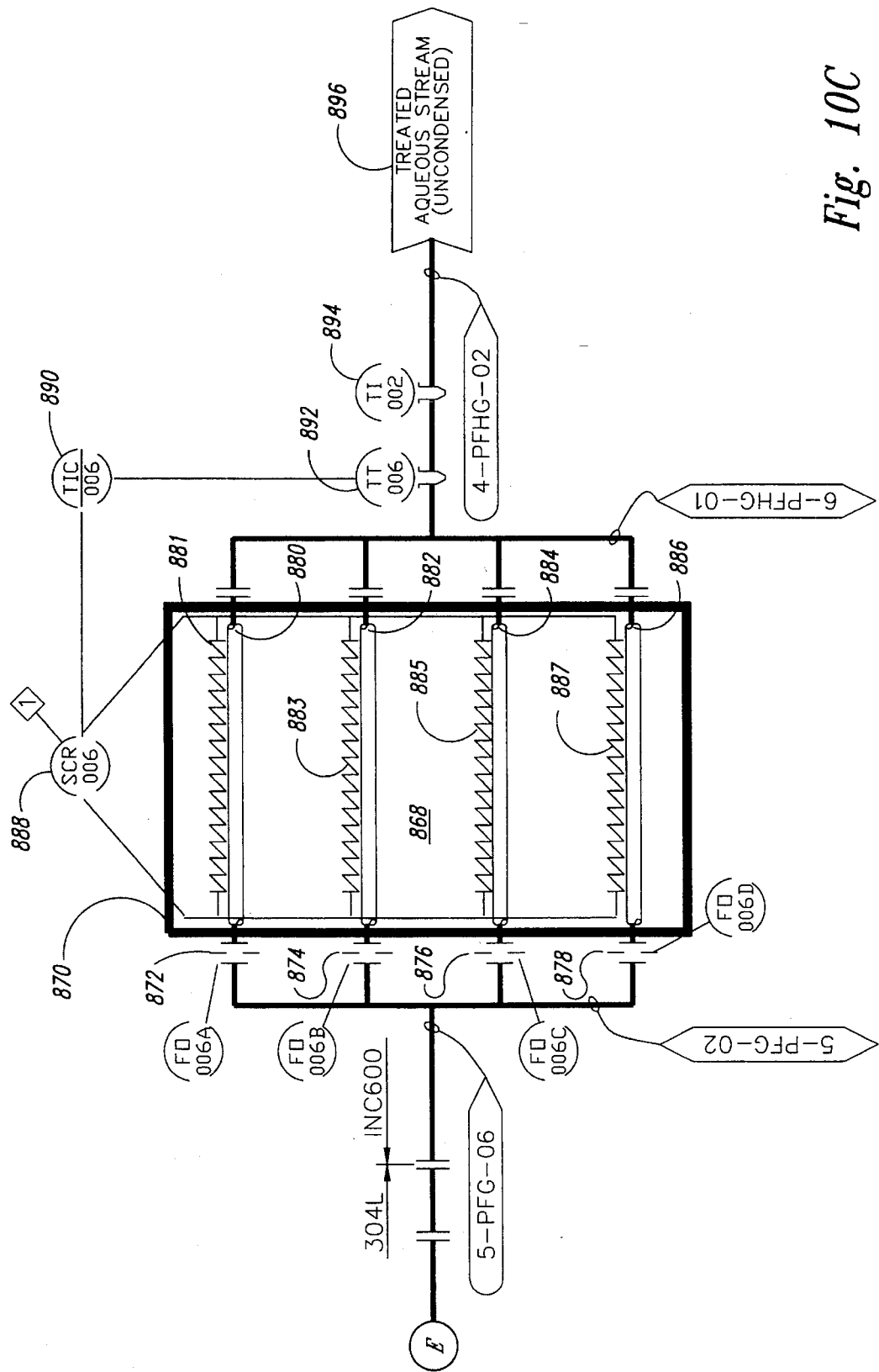

Referring to FIGS. 10A, 10B and 10C, flow of aqueous stream 800 is regulated using metering pump 802 in combination with silicon rectifier 804, flow indicating controller 806, and flow transmitter 808 which spans flow orifice 810. Pressure indicator 812 is located upstream of vaporization zone 814, which consists of two 11 foot segments of 2.47 inch inner diameter stainless steel pipe, and which is represented in this figure in two portions. After passing through vaporization zone 814, the temperature of aqueous stream 800 is monitored using temperature transmitter 824 and pressure is monitored using pressure indicator 830. Aqueous stream 800 then passes through coupling 832 and enters first intermediate zone 834, which is an 11 foot segment of 2.47 inch inner diameter stainless steel pipe. After passing through first intermediate zone 834, temperature is monitored using temperature indicator 840 and pressure is monitored using pressure indicator 842. Aqueous stream 800 then passes through coupling 844 and enters second intermediate zone 846, an 11 foot segment of 3.07 inch inner diameter stainless steel pipe. Temperature is monitored after the second intermediate zone 846 using temperature indicator 848 and pressure is monitored with pressure indicator 850. Aqueous stream 800 then enters third intermediate zone 852, an 11 foot segment of 5.05 inch inner diameter stainless steel pipe, where temperature is monitored with temperature indicator 858 and pressure is monitored with pressure indicator 860.

A series of rupture disks are employed throughout this portion of the system to permit flow to 50 gallon emergency blow down tank 862. Specifically, flow to emergency blow down tank 862 from vaporization zone 814 is controlled by rupture disks 818 and 822, which are connected via couplings 816 and 820, respectively. Flow to emergency blow down tank 862 from the portion of the apparatus between the first and second intermediate zones (834 and 846, respectively) is controlled by rupture disk 838, which is connected via coupling 836. Flow to emergency blow down tank 862 from the portion of the apparatus downstream of the third intermediate zone is controlled by rupture disk 856, which is connected via coupling 854.

Vaporization zone 814 and intermediate zones 834, 846 and 852 are heated using 150 psig steam 900, which is generated using a boiler (not shown). Steam 900 enters steam jackets 815 and 817 surrounding vaporization zone 814 through temperature control valve 902, which is connected to temperature indicating controller 825. Similarly, steam 900 heats intermediate zones 834, 846 and 852 by entering steam jackets 835, 847 and 853, respectively, and which are controlled by valves 904, 906 and 908, respectively. After being used to heat vaporization zone 814 and intermediate zones 834, 846 and 852, steam 900 passes through traps 910, 912, 914, 916 and 918, respectively, and passes to the condenser portion of the apparatus as condensate 926. Steam 900 which does not travel through any of the steam jackets passes through trap 922 and coupling 920, and similarly passes to the condenser portion as condensate 926.

After passing through the third intermediate zone 852, aqueous stream 800 enters refractory zone 868 which is contained within insulated enclosure 870. Refractory zone 868 contains four 3.26 inch inner diameter INKONAL™ pipes (each 11 feet in length) 880, 882, 884 and 886, which aqueous stream 800 enters by way of flow orifices 872, 874, 876 and 878, respectively. Pipes 880, 882, 884 and 886 are heated by resistance heaters 881, 883, 885 and 887, respectively. Temperature is controlled using silicon rectifier 888 and temperature indicating controller 890, as well as temperature transmitter 892 and temperature indicator 894. The uncondensed, treated aqueous stream 896 exits the refractory zone, and enters the condenser portion of the apparatus, shown in FIGS. 10D and 10E.

Figure 10D:
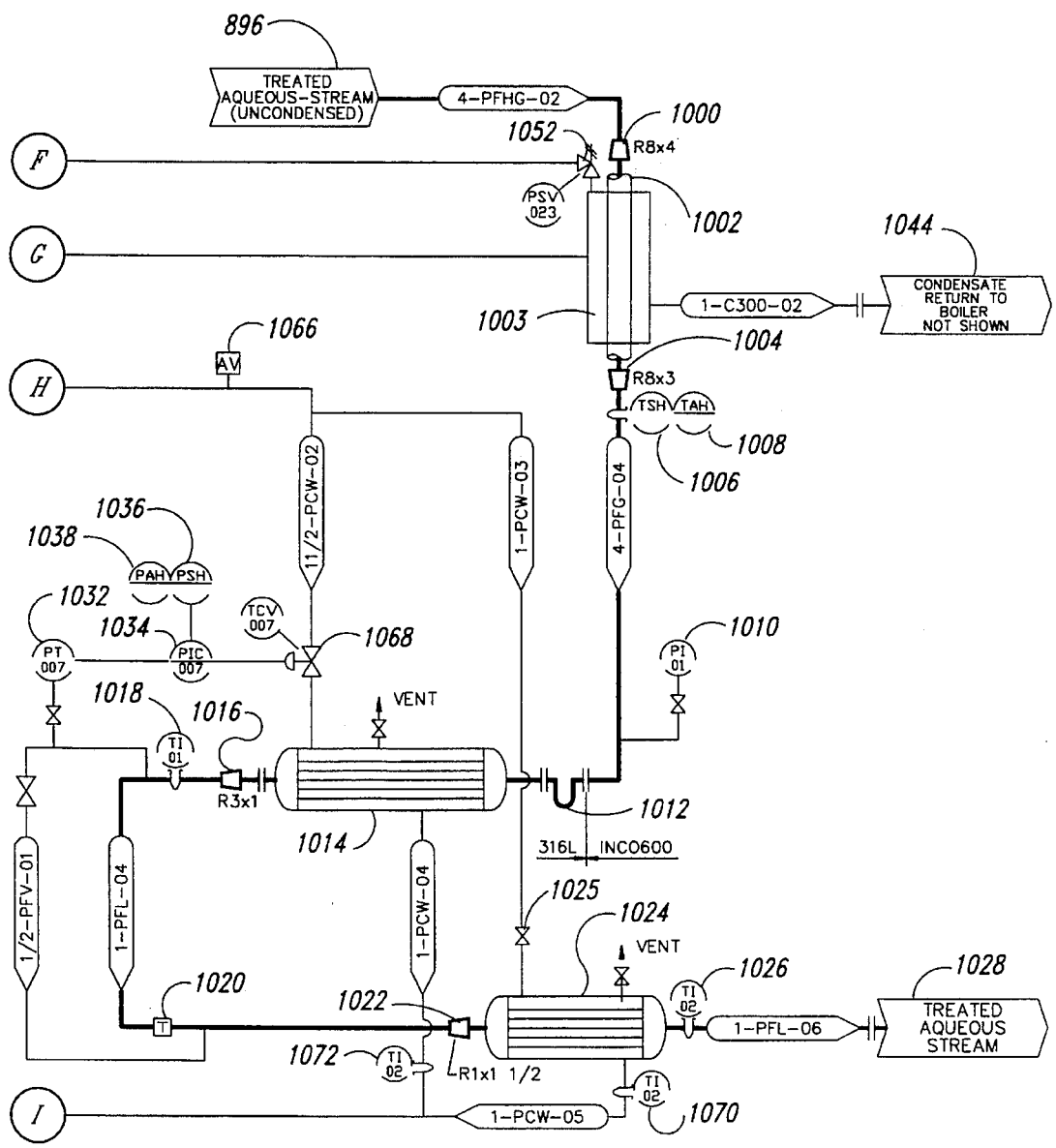
Figure 10E:
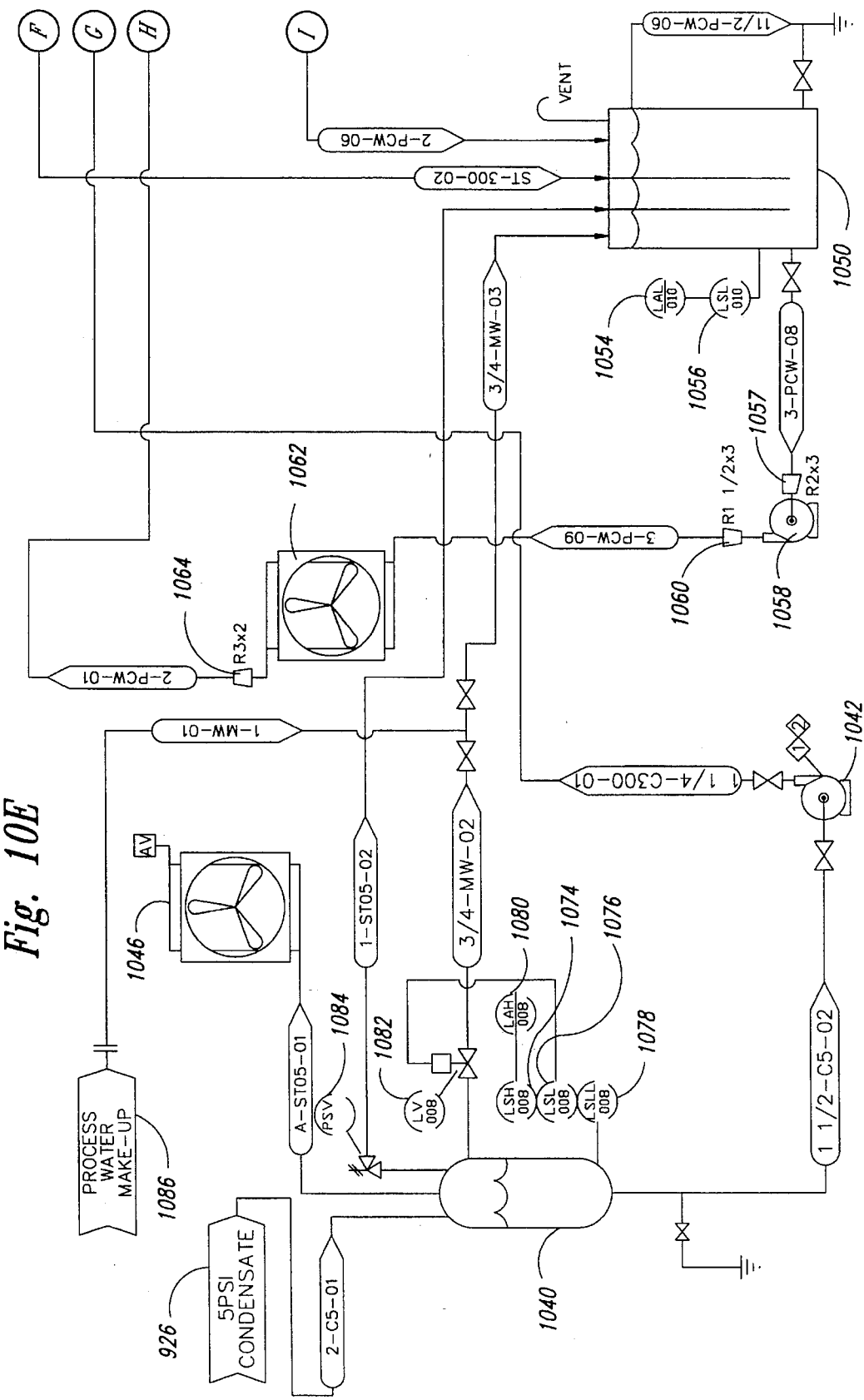
Figure 10F:
FIG. 10F is a legend of the symbols used in FIGS. 10A through 10E.
Figure 10F:
Figure 10F:
Figure 10F:
Figure 10F:
Figure 10F:

FIGS. 10D and 10E illustrate the condenser portion of this representative apparatus. Uncondensed, treated aqueous stream 896 passes through coupling 1000 and enters precooler 1002. It then passes through coupling 1004 and temperature is monitored using temperature switch high 1006 and temperature alarm high 1008. Pressure is monitored using pressure indicator 1010. Treated aqueous stream 896 then passes through expansion joint 1012 and enters condenser 1014. After contacting temperature indicator 1018, pressure of treated aqueous stream 896 is monitored using pressure transmitter 1032, pressure indicating controller 1034, pressure alarm high 1038 and pressure safety high 1036. Treated aqueous stream 896 then passes through coupling 1016, trap 1020 and coupling 1022, treated aqueous stream 896 enters cooler 1024. Treated aqueous stream 1028 exits cooler 1024, and temperature is monitored using temperature indicator 1026.

Water for use in precooler 1002, condenser 1014 and cooler 1024 is generated primarily from condensate 926, shown in FIG. 10E. Condensate 926 enters condensate receiver 1040, and passes to condensate pump 1042. Condensate 926 then enters external jacket 1003 surrounding precooler 1002. After exiting external jacket 1003, condensate 1044 is returned to the boiler (not shown). Alternatively, condensate 926 may pass from steam jacket 1003 to cooling water tank 1050 by way of pressure safety valve 1052. Condensate 926 may also pass from condensate receiver 1040 to cooling water tank 1050 via liquid valve 1082 or pressure safety valve 1084. Liquid valve 1082 is controlled by level switch low low 1078, level switch low 1076, level switch high 1074, and level alarm high 1080. Level alarm low 1054 and level switch low 1056 monitor the level of water in cooling water tank 1050.

Process water make-up 1086 is used to maintain a sufficient water level in cooling water tank 1050. Water from cooling water tank 1050 passes to cooling water pump 1058 via coupling 1057 and, by way of coupling 1060, passes to cooling water cooler 1062. From there, water from cooling water cooler 1062 passes through coupling 1064, past air vent 1066, and enters condenser 1014 by way of temperature control valve 1068, and cooler 1024 via valve 1025. Water from condenser 1014 and cooler 1024 is returned to cooling water tank 1050 by way of temperature indicators 1072 and 1070, respectively.

Figure 11C:
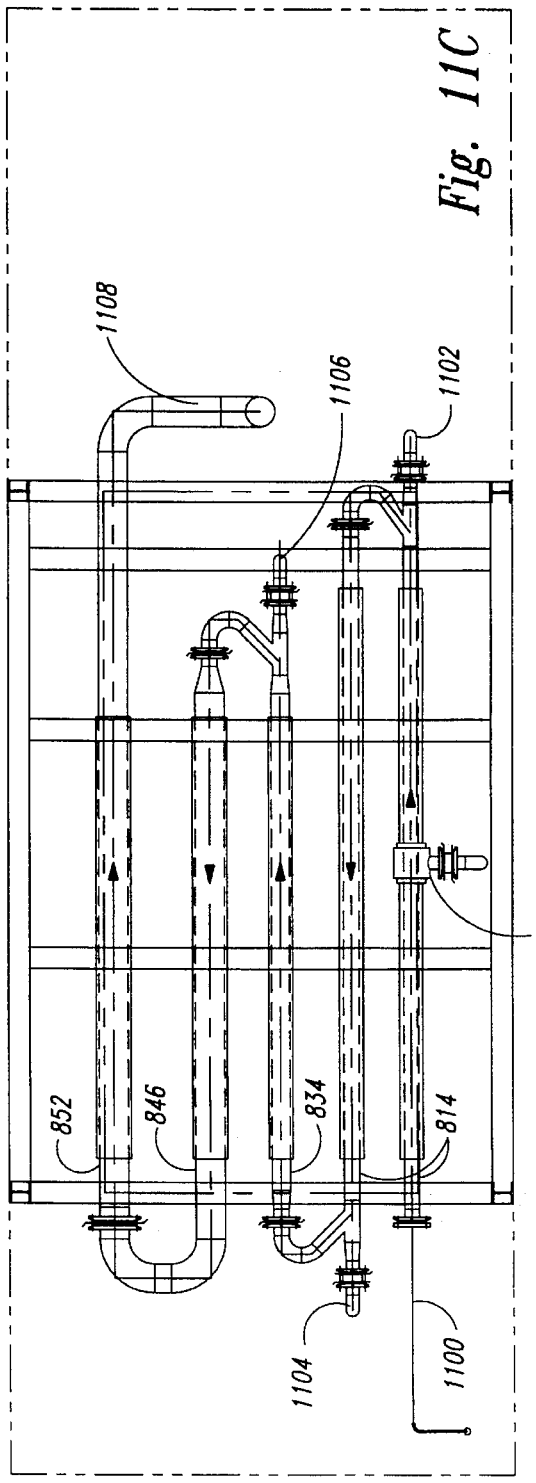

FIGS. 11A through 11G illustrate a further representative apparatus of this invention. Referring to FIG. 11A, a side elevation view of the apparatus is illustrated. The base of the apparatus contains pump 802, as well as precooler 1002, condenser 1014, and cooler 1024. Vaporization zone 814 is located at an intermediate height off the base and refractory zone pipe 886, surrounded by insulated enclosure 870, is present at a higher level above tabletop 1112. This view also illustrates control panel 1110 and cooling water cooler 1062.

Refractory zone 868 is shown in FIG. 11B, a cross-sectional view taken substantially along line 11B—11B of FIG. 11A. Refractory zone 868 is located at the top of the apparatus, and contains four pipes 880, 882, 884, and 886. FIG. 11C shows the portion of the apparatus upstream of the refractory zone and is a cross-sectional view taken substantially along line 11C—11C of FIG. 11A. In this figure, inlet 1100 is joined to vaporization zone 814, comprised of two parallel pipes, with test probe attachment site 1101 inserted part way along the first parallel pipe. Vaporization zone 814 is joined to first intermediate zone 834, second intermediate zone 846, and third intermediate zone 852. Temperature and pressure may be monitored by inserting appropriate sensors into sensor probe attachment sites 1102, 1104, and 1106. Connecting pipe 1108 joins third intermediate zone 852 to the refractory zone (not shown).

Figure 11D:
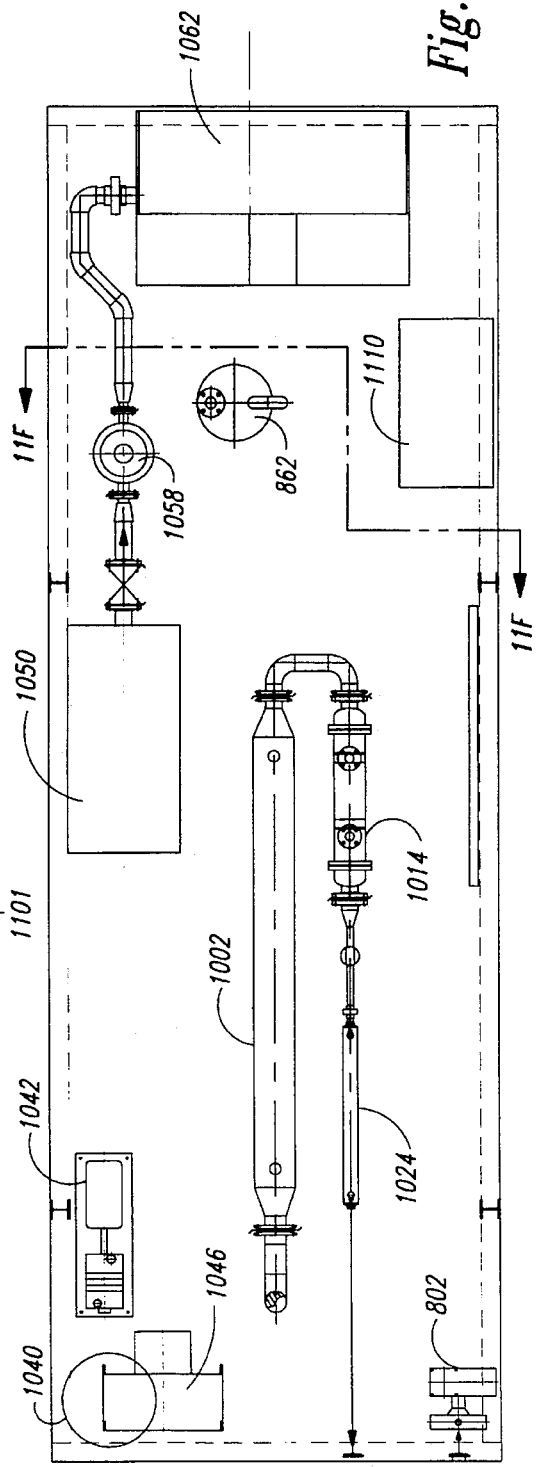

FIG. 11D, a cross-sectional view taken substantially long line 11D—11D of FIG. 11A, illustrates the base of the apparatus. The back of the apparatus contains metering pump 802, as well as precooler 1002, condenser 1014, and cooler 1024. In addition, condensate pump 1042 is located with condensate receiver 1040 and flash condenser 1046. Cooling water tank 1050 and cooling water pump 1058 are located with cooling water cooler 1062. Emergency blow-down tank 862 and control panel 1110 are also present on this level.

Figure 11E:
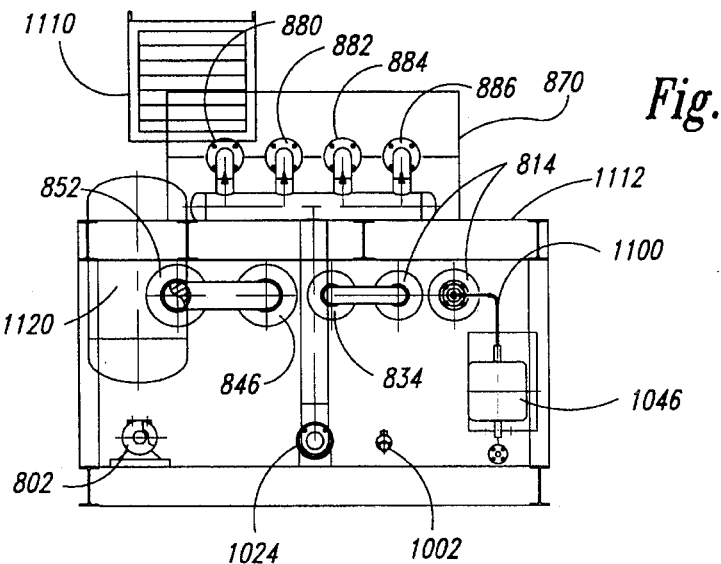

In FIG. 11E, the from elevation view taken substantially along line 11E—11E of FIG. 11A is shown. This figure shows control panel 1110 behind insulated enclosures 870, which surrounds refractory zone pipes 880, 882, 884, and 886, located on top of table 1112. Beneath table 1112 is inlet 1100, which is connected to vaporization zone 814, which in turn is joined to first intermediate zone 834, second intermediate zone 846, and third intermediate zone 852. Also shown in this cross-section are flash condenser 1046, 1002, cooler 1024, pump 802 and condensate receiver 1040.

Figure 11F:
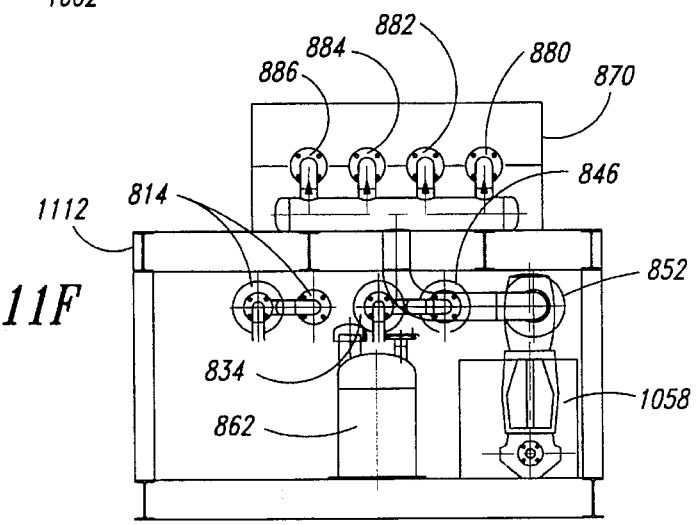

FIG. 11F illustrates the cross-sectional view taken substantially along line 11F—11F of FIG. 11E. This cross-section shows insulated enclosure 870, surrounding refractory zone pipes 880, 882, 884, and 886, and located on table 1112. Beneath table 1112 are vaporization zone 814, first intermediate zone 834, second intermediate zone 846, and third intermediate zone 852. The emergency blowdown tank 862 and cooling water pump 1058 are also shown.

Figure 11G:
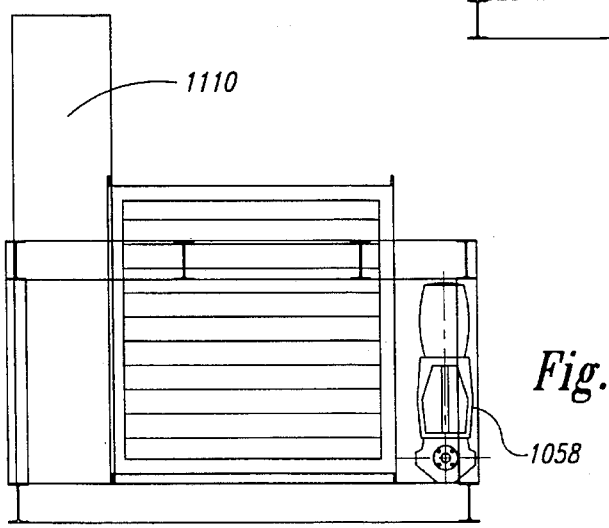

FIG. 11G shows the rear elevation view taken substantially along line 11G—11G of FIG. 11A. This view shows control panel 1110 and cooling water pump 1058.

The present invention is illustrated by reference to the following examples, which are to be regarded as illustrative rather than restrictive. Unless otherwise noted, all parts and percentages in the Examples as well as the specification and claims are by weight and pressures are in excess of atmospheric pressure. Zone temperatures in the Examples and specification are internal temperatures.

EXAMPLES

Example 1

Treatment of a Material Containing Organic DPCs

This Example illustrates the treatment of a material (i.e., an aqueous solution) containing organic DPCs, using the representative five-zone apparatus of FIG. 3. The refractory zone was the three-tube embodiment illustrated in FIGS. 7B and 7C. In this Example, the material was used as the aqueous stream without further modification.

Two liters of an aqueous solution containing the following DPCs were prepared:

| DPC | ppm |
|---|---|
| Acetone | 11,000 |
| Benzene | 90 |
| 4-methyl-2-pentanone (MIBK) | 700 |
| 2-butanone (MEK) | 8,100 |
| Hydrazine | 20,000 |
| EDTA | 100,000 |

The concentrations of the first five DPCs listed above (i.e., all except EDTA) were confirmed using two analytical techniques. First, EPA Standard Method 8240 was used to determine the levels of specific volatile compounds. The compounds that may be detected by this method are listed in Table 2.

TABLE 2

Compounds Detectable by EPA Method 8240

| | |
|---|---|
| Dichlorodifluoromethane | 4-Methyl-2-pentanone (MIBK) |
| Chloromethane | Toluene |
| Vinyl chloride | Ethyl methacrylate |
| Bromomethane | Tetrachloroethene |
| Chloroethane | 2-Hexanone |
| Trichlorofluoromethane | Dibromochloromethane |
| 1,1-Dichloroethene | 1,2-Dibromoethane (EDB) |
| Carbon disulfide | Chlorobenzene |
| Iodomethane | Ethylbenzene |
| Acetone | 1,1,1,2-Tetrachloroethane |
| Allyl chloride | m,p-Xylene |
| Acetonitrile | o-Xylene |
| Dichloromethane | Styrene |
| trans-1,2-Dichloroethene | Bromoform |
| 1,1-Dichloroethene | cis-1,4-Dichloro-2-butene |
| Chloroform | Bromobenzene |
| 1,2-Dichloroethane | 1,1,2,2-Tetrachloroethane |
| Vinyl Acetate | 1,2,3-Trichloropropane |
| 2-Butanone (MEK) | trans-1,4-Dichloro-2-butene |
| Methacrylonitrile | 1,3 Dichlorobenzene |
| 1,1,1-Trichloroethane | 1,4-Dichlorobenzene |
| Carbon Tetrachloride | Benzyl chloride |
| Benzene | 1,2-Dichlorobenzene |
| Trichloroethane | 1,2-Dibromo-3-chloropropane (DBCP) |
| 1,2-Dichloropropane | Bromodichloromethane |
| Methyl methacrylate | |

The above method confirmed the concentrations of acetone, benzene, MIBK and MEK in the material. (A laboratory contaminant, dichloromethane, was also detected in this analysis at a level of 2.4 ppm in the 1000 fold dilution of the sample analyzed.) No other compounds in Table 2 were detected. Second, NIOSH Method 3503 (NIOSH Manual of Analytical Methods, February 1984), was used to confirm the level of hydrazine in the material. The level of EDTA was estimated based on the dilution of a known concentration of EDTA in preparing the material. AWWA Standard Method 2340, which analyzes for EDTA by back titration and which was used for subsequent EDTA analyses, could not be used to confirm the level of EDTA in this material because of interference from other components.

The vaporization temperature was set at 102° C., which was sufficient to vaporize most of the water within the aqueous stream. The refractory temperature was set based upon the thermal stability temperature of the most refractile DPC. As shown in Table 1, the DPC with the highest thermal stability temperature in the aqueous stream is benzene, which has a thermal stability temperature of 1150° C. Accordingly, the refractory temperature was set at 549° C., which is slightly less than half of the thermal stability temperature, when expressed in °C.

No intermediate temperatures were necessary because all of the DPCs could proceed directly from the vaporization temperature to the refractory temperature without adverse reaction. Thus, the intermediate zones of the apparatus were maintained at temperatures sufficient to preserve the vaporized state of the aqueous stream until its entry into the refractory zone, as shown below:

| Zone | Temperature (°C.) |
|---|---|
| Vaporization | 102 |
| First intermediate | 101 |
| Second intermediate | 101 |
| Third intermediate | 103 |
| Refractory | 549 |

In other words, the apparatus was operated as a two zone system, where the first zone of the apparatus was maintained at the vaporization temperature, the second, third and fourth zones were not needed for treatment (and were therefore maintained at a temperature sufficient to maintain the vaporized state of the aqueous stream) and the fifth zone was maintained at the refractory temperature.

The aqueous stream was directed into the vaporization zone at a flow rate of 0.5 L/min and a pressure of 8 psi, such that the dwell time in the zones upstream of the refractory zone was about 0.7 seconds and the dwell time in the refractory zone was about 0.3 seconds (for a total of about 1 second in the apparatus). The pressure at the exit of the first intermediate zone was 1.58 psi, the pressure at the exit of the third intermediate zone was 0.72 psi, and the pressure between the first and second condensers was approximately zero.

A test aliquot was withdrawn from the aqueous stream after passage through the first condenser, at a temperature of 60° C.–65° C. The test aliquot was analyzed by the two methods described above for the original material, and by AWWA Standard Method 2340 (for EDTA). The levels of the original DPCs after treatment are shown below:

| DPC | ppm |
|---|---|
| Acetone | <0.005 |
| Benzene | 0.11 |
| 4-methyl-2-pentanone (MIBK) | 0.12 |
| 2-butanone (MEK) | <0.005 |
| Hydrazine | <1 |
| EDTA | 110 |

Trace levels (i.e., less than about 0.01 ppm) of chloroform, toluene, ethylbenzene, m,p-xylene, o-xylene and styrene were also detected, again due to laboratory contamination. No other volatile organic compounds listed in Table 2 were detected. These analyses demonstrate that all of the DPCs in the material were thermally decomposed, thus rendering the material more suitable for disposal.

Example 2

The Effect of Lowering the Refractory Temperature on the Treatment of a Material Containing DPCs The experiment described in Example 1 was repeated using a refractory temperature of 510° C. Analysis of the test aliquot by the methods described in Example 1 detected the following levels of DPCs:

| DPC | ppm |
|---|---|
| Acetone | 110 |
| Benzene | <1 |
| 4-methyl-2-pentanone (MIBK) | 5 |
| 2-butanone (MEK) | 50 |
| Hydrazine | <1 |
| EDTA | 210 |

Trace levels of dichloromethane were again found due to laboratory contamination, but no other volatile organic compounds listed in Table 2 were detected.

These results show a significant reduction in the levels of the DPCs, but the treatment using the 510° C. refractory temperature was less complete than treatment at 549° C.

Example 3

Treatment of a Material Containing Benzene and MEK

This Example illustrates the treatment of a material (i.e., an aqueous solution) containing benzene and MEK, using the representative five-zone apparatus of FIG. 3. The refractory zone was the three-tube embodiment illustrated in FIGS. 7B and 7C. In this Example, the material was used as the aqueous stream without further modification.

Four liters of an aqueous solution containing the following DPCs were prepared:

| DPC | ppm |
|---|---|
| Benzene | 3,400 |
| 2-butanone (MEK) | 2,000 |

The vaporization temperature was set at 102° C., which was sufficient to vaporize most of the water within the aqueous stream. The refractory temperature was selected based on the thermal stability temperature of the most refractory DPC. As shown in Table 1, the DPC with the highest thermal stability temperature is benzene, which has a thermal stability temperature of 1150° C. Accordingly, the refractory temperature was set at 560° C., which is slightly less than half of the thermal stability temperature.

No intermediate temperatures were necessary because all of the DPCs could proceed directly from the vaporization temperature to the refractory temperature without adverse reaction. Accordingly, the first two intermediate zones of the apparatus were maintained at temperatures sufficient to preserve the vaporized state of the aqueous stream. The third intermediate zone was set to a slightly elevated preparation temperature to provide for increased efficiency of heating to the refractory temperature. Thus, the zone temperatures were set as follows:

| Zone | Temperature (°C.) |
|---|---|
| Vaporization | 102 |
| First intermediate | 103 |
| Second intermediate | 103 |
| Third intermediate | 127 |
| Refractory | 560 |

In other words, the apparatus was operated as a three zone system, where the first zone of the apparatus was maintained at the vaporization temperature, the second and third zones were not needed for treatment (and were therefore maintained at a temperature sufficient to maintain the vaporized state of the aqueous stream), the fourth zone was maintained at a slightly elevated preparation temperature and the fifth zone was maintained at the refractory temperature.

The aqueous stream was directed into the vaporization zone at a flow rate of 0.5 L/min and a head pressure of 8 psi, such that the dwell time in the zones upstream of the refractory zone was about 0.7 seconds and the dwell time in the refractory zone was about 0.3 seconds (for a total of about 1 second in the apparatus). The pressure at the exit of the first intermediate zone was 1.55 psi, the pressure at the exit of the third intermediate zone was 0.70 psi, and the pressure between the first and second condensers was approximately zero.

A test aliquot was withdrawn from the aqueous stream after passage through the first condenser, at a temperature of 60° C.–65° C. The test aliquot was analyzed by Standard Method 8240, as described in Example 1. The levels of the DPCs after thermal decomposition are shown below:

| DPC | ppm |
|---|---|
| Benzene | <20 |
| 2-butanone (MEK) | 630 |

This analysis also detected trace levels of carbon disulfide and dichloromethane due to laboratory contamination, but no other volatile organics were found. Thus, the treatment parameters were sufficient to thermally decompose a significant amount of the DPCs present in the material.

Example 4

The Effect of Lowering the Refractory Temperature on the Treatment of a Material Containing Benzene and MEK The experiment described in Example 3 was repeated using a lower refractory temperature of 468° C. A test aliquot was analyzed for benzene and MEK using EPA Standard Method 8240, and was found to contain <20 ppm benzene and 880 ppm MEK. Accordingly, a refractory temperature of 468° C. (which is 40% of the thermal stability temperature) is sufficient to provide complete thermal decomposition of the benzene, with only a slight increase in the level of MEK detected.

Example 5

Removal of Heavy Metals from a Material

This Example illustrates the removal of heavy metals from a material using the representative five-zone apparatus of FIG. 3. The refractory zone was the three-tube embodiment illustrated in FIGS. 7B and 7C. In this Example, the material was used as the aqueous stream without further modification.

A highly turbid, aqueous material containing dissolved metals and about 20% garnet (after passage through a 1μ filter) was obtained from a commercial source. The following unchelated metals were present in the material:

| Heavy Metal | Concentration (ppm) |
|---|---|
| Chromium | 0.124 |
| Lead | 8.75 |
| Copper | 0.12 |
| Nickel | 0.124 |
| Zinc | 1.24 |

The vaporization temperature was set at 103° C., which was sufficient to vaporize most of the water within the aqueous stream. The refractory temperature was selected to be within the range normally sufficient for treatment of heavy metals. Because of the complexity of the material, and the high percentage of suspended particles, a refractory temperature near the middle of the normal range was chosen. The selected refractory temperature was 357° C.

No intermediate temperatures were necessary because all of the DPCs could proceed directly from the vaporization temperature to the refractory temperature without adverse reaction. Accordingly, the first two intermediate zones of the apparatus were maintained at temperatures sufficient to preserve the vaporized state of the aqueous stream. The third intermediate zone was set to a slightly elevated preparation temperature to provide for increased efficiency of heating to the refractory temperature. Thus, the zone temperatures were set as follows:

| Zone | Temperature (°C.) |
| --- | --- |
| Vaporization | 103 |
| First intermediate | 100 |
| Second intermediate | 100 |
| Third intermediate | 112 |
| Refractory | 357 |

In other words, the apparatus was operated as a two zone system, where the first zone of the apparatus was maintained at the vaporization temperature, the second and third zones were not needed for treatment (and were therefore maintained at a temperature sufficient to maintain the vaporized state of the aqueous stream), the fourth zone was maintained at a slightly elevated preparation temperature and the fifth zone was maintained at the refractory temperature.

Twelve liters of the material were directed into the vaporization zone at a flow rate of 0.5 L/min and a pressure of 8 psi, such that the dwell time in the zones upstream of the refractory zone was about 0.7 seconds and the dwell time in the refractory zone was about 0.3 seconds (for a total of about 1 second in the apparatus). The pressure at the exit of the first intermediate zone was 1.56 psi, the pressure at the exit of the third intermediate zone was 0.72 psi, and the pressure between the first and second condensers was approximately zero.

A test aliquot was withdrawn from the aqueous stream after passage through the first condenser, at a temperature of 60° C.–65° C. The test aliquot was visually free of suspended particles, and was examined for the above heavy metals by Atomic Absorption Spectroscopy using EPA SW-846 Method 6010. The concentration of these heavy metals in the test aliquot was as follows:

| Heavy Metal | Concentration (ppm) |
| --- | --- |
| Chromium | 0.018 |
| Lead | 0.032 |
| Copper | 0.00 |
| Nickel | 0.06 |
| Zinc | 0.03 |

Thus, the treatment parameters were sufficient to remove substantially all of the heavy metals from this material. In this example, the metals are believed to have been plated on the walls of the apparatus, specifically on the interior of the refractory zone. Treatment also removed a substantial amount of the garnet, which settled in the refractory zone, and could be removed by increasing the flow rate.

Example 6

Treatment of a Chelated Metal

This Example illustrates the treatment of a chelated metal, using the representative five-zone apparatus of FIG. 3. The refractory zone was the one-tube embodiment illustrated in FIG. 7A. In this Example, the material was used as the aqueous stream without further modification.

Six liters of a test solution that contained 60 ppm chelated chromium was obtained from a commercial source.

The vaporization temperature was set at 103° C., which was sufficient to vaporize most of the water in the aqueous stream. The refractory temperature was selected to be within the range normally sufficient for treatment of heavy metals and sufficient to decompose chelating agents such as EDTA (see Example 7). Since this material did not contain suspended particles, a refractory temperature near the low end of the normal range was chosen. Accordingly, the refractory temperature was 260° C.

No intermediate temperatures were necessary because all of the DPCs could proceed directly from the vaporization temperature to the refractory temperature without adverse reaction. Accordingly, the first two intermediate zones of the apparatus were maintained at temperatures sufficient to preserve the vaporized state of the aqueous stream. The third intermediate zone was set to a slightly elevated preparation temperature to provide for increased efficiency of heating to the refractory temperature. Thus, the zone temperatures were set as follows:

| Zone | Temperature (°C.) |
| --- | --- |
| Vaporization | 103 |
| First intermediate | 104 |
| Second intermediate | 104 |
| Third intermediate | 121 |
| Refractory | 260 |

In other words, the apparatus was operated as a two zone system, where the first zone of the apparatus was maintained at the vaporization temperature, the second and third zones were not needed for treatment (and were therefore maintained at a temperature sufficient to maintain the vaporized state of the aqueous stream), the fourth zone was maintained at a slightly elevated preparation temperature, and the fifth zone was maintained at the refractory temperature.

The aqueous stream was directed into the vaporization zone at a flow rate of 0.5 L/min and a pressure of 10 psi. The pressure at the exit of the first intermediate zone was 1.65 psi, the pressure at the exit of the third intermediate zone was 1.40 psi, and the pressure between the first and second condensers was approximately zero. The dwell time in the zones upstream of the refractory zone was about 1.3 seconds and the dwell time in the refractory zone was about 0.5 seconds.

A test aliquot was withdrawn from the aqueous stream after passage through the first condenser, at a temperature of 60° C.–65° C. The test aliquot was analyzed according to EPA Standard Method 3005, and was found to contain less than 0.05 ppb chromium. Accordingly, most of the metal was deposited along the walls of the apparatus. Furthermore, the detected chromium was nonchelated, and thus was more suitable for disposal.

Example 7

Treatment of a Material Containing Hydrazine and EDTA

This Example illustrates the optimization of conditions for thermal decomposition of an aqueous material containing hydrazine and EDTA, using the representative five-zone apparatus of FIG. 3. The refractory zone was the one-tube embodiment illustrated in FIG. 7A. In this Example, the material was used as the aqueous stream without further modification.

Six liters of an aqueous test solution containing the following DPCs were prepared:

| DPC | ppm |
| --- | --- |
| Hydrazine | 33,000 |
| EDTA | 170,000 |
| Thiourea | 1,000 |
| Alkanol Wxn | 2,000 |

Because of the potential for explosion if all of the hydrazine is not at least partially decomposed before entering the refractory zone, test reactions were performed to evaluate the decomposition of hydrazine at temperatures near the vaporization temperature. In these test reactions, a solution containing 33,000 ppm hydrazine was treated in the vaporization and first intermediate zones of the reactor, set to either 95° C. or 98° C. In each case, the aqueous stream was directed into the vaporization zone at a flow rate of 0.4 L/min and a head pressure of 10 psi. Test aliquots were withdrawn after the aqueous stream passed through the first intermediate zone, and were analyzed for hydrazine, ammonia, nitrate and nitrite. The following results were obtained:

| | ppm | | | |
| --- | --- | --- | --- | --- |
| Temp. (°C.) | hydrazine | ammonia | nitrate | nitrite |
| 95 | 18,000 | 21 | 320 | <0.01 |
| 98 | 140 | 0.95 | 650 | <0.01 |

These results indicate that nearly all of the hydrazine is at least partially decomposed after treatment in two zones at 98° C. The data also suggest that the decomposition to $N_2$ occurs by way of ammonia and nitrate.

In a further experiment, the vaporization temperature was set at 102° C., which was sufficient to vaporize most of the water in the aqueous stream. To provide time for adequate decomposition of the hydrazine at low temperatures, an intermediate temperature of 106° C. was then used (in the first two intermediate zones of the apparatus). The third intermediate zone was set to a slightly elevated preparation temperature to provide for increased efficiency of heating to the refractory temperature.

The refractory temperature for treatment of this material was initially set at 521° C. Thus, the zone temperatures for the first experiment were set as shown below:

| Zone | Temperature (°C.) |
| --- | --- |
| Vaporization | 102 |
| First intermediate | 106 |
| Second intermediate | 106 |
| Third intermediate | 141 |
| Refractory | 521 |

In other words, the apparatus was operated as a three zone system, where the first zone of the apparatus was maintained at the vaporization temperature, the second and third zones were maintained at the intermediate temperature, the fourth zone was maintained at a preparation temperature and the fifth zone was maintained at the refractory temperature.

The aqueous stream was directed into the vaporization zone at a flow rate of 0.5 L/min and a pressure of 18 psi. The pressure at the exit of the first intermediate zone was 1.75 psi, the pressure at the exit of the third intermediate zone was 1.25 psi, and the pressure between the first and second condensers was approximately zero (compared to atmospheric pressure).

A test aliquot was withdrawn from the aqueous stream after passage through the first condenser, at a temperature of 60° C.–65° C. The test aliquot was analyzed for EDTA by back titration using EPA Standard Method 2340, and was found to contain <0.5 ppm EDTA. Analysis for hydrazine was also performed by NIOSH Method 3503, and the test aliquot was found to contain 15 ppm hydrazine. These analyses demonstrate that substantially all of the hydrazine and EDTA were decomposed by thermal decomposition at these zone temperatures.

Further experiments were then performed to optimize the thermal decomposition by lowering the refractory temperature. In a second experiment, the above material was treated at the following temperatures:

| Zone | Temperature (°C.) |
| --- | --- |
| Vaporization | 102 |
| First intermediate | 103 |
| Second intermediate | 103 |
| Third intermediate | 135 |
| Refractory | 316–371 |

The only significant temperature adjustment in this experiment was the lowering of the refractory temperature from 521° C. to 316° C.–371° C. The aqueous stream was directed into the vaporization zone at a flow rate of 1 L/min and a head pressure of 10 psi. The pressure at the exit of the first intermediate zone was 1.60 psi, the pressure at the exit of the third intermediate zone was 0.55 psi, and the pressure between the first and second condensers was approximately zero.

A test aliquot was withdrawn from the aqueous stream after passage through the first condenser, at a temperature of 60° C.–65° C. The test aliquot was analyzed for EDTA and hydrazine by the methods described above, and was found to contain 0.6 ppm hydrazine and 60 ppm EDTA. Thus, the lowering of the refractory temperature resulted in incomplete, but still adequate, treatment of the EDTA, and did not adversely affect the decomposition of the hydrazine.

In a third experiment, a material containing 33,000 ppm hydrazine and 170,000 ppm EDTA was treated at the following temperatures, where the refractory temperature was further lowered:

| Zone | Temperature (°C.) |
| --- | --- |
| Vaporization | 100 |
| First intermediate | 99 |
| Second intermediate | 99 |
| Third intermediate | 116 |
| Refractory | 204 |

The aqueous stream was directed into the vaporization zone at a flow rate of 0.5 L/min and a pressure of 10 psi. The pressure at the exit of the first intermediate zone was 1.30 psi, the pressure at the exit of the third intermediate zone was 0.65 psi, and the pressure between the first and second condensers was approximately zero.

A test aliquot was withdrawn from the aqueous stream after passage through the first condenser, at a temperature of 60° C.–65° C. The test aliquot was analyzed as described above for hydrazine and EDTA, and contained 350 ppm hydrazine and 2,500 ppm EDTA. Accordingly, lowering the refractory temperature to 204° C. resulted in significantly decreased decomposition of the hydrazine and EDTA.

Finally, the above material was treated at the following temperatures:

| Zone | Temperature (°C.) |
| --- | --- |
| Vaporization | 102 |
| First intermediate | 99 |
| Second intermediate | 99 |
| Third intermediate | 116 |
| Refractory | 232 |

The aqueous stream entered the vaporization zone at a flow rate of 0.5 L/min and a head pressure of 10 psi. The pressure at the exit of the first intermediate zone was 1.35 psi, the pressure at the exit of the third intermediate zone was 0.70 psi, and the pressure between the first and second condensers was approximately zero.

When a test aliquot was analyzed, as described above, for hydrazine and EDTA it was found to contain 350 ppm hydrazine and 240 ppm EDTA. Thus, raising the refractory temperature from 204° C. to 232° C. significantly improved the decomposition of the EDTA.

Example 8

Treatment of a Material Containing Ammonium Persulfate

This Example illustrates the thermal decomposition of an aqueous material containing 15% by weight ammonium persulfate, using the representative five-zone apparatus of FIG. 3. The refractory zone was the one-tube embodiment illustrated in FIG. 7A. In this Example, the material was used as the aqueous stream without further modification.

The vaporization temperature was set at 102° C., which was sufficient to vaporize most of the water in the aqueous stream. To prevent crystallization of the ammonium persulfate, an intermediate temperature of 93° C. was used (in the first two intermediate zones of the apparatus). The use of this intermediate temperature allowed extended treatment in the presence of both liquid and vaporized water, which sufficiently modified the ammonium persulfate to avoid crystallization. The third intermediate zone was set to a slightly elevated preparation temperature to provide for increased efficiency of heating to the refractory temperature.

The refractory temperature for treatment of this material was initially set at 521° C., a value near the middle of the normal range for treatment of inorganic complexes. Thus, the zone temperatures for the first experiment were set as shown below:

| Zone | Temperature (°C.) |
| --- | --- |
| Vaporization | 102 |
| First intermediate | 93 |
| Second intermediate | 93 |
| Third intermediate | 141 |
| Refractory | 521 |

In other words, the apparatus was operated as a three zone system, where the first zone of the apparatus was maintained at the vaporization temperature, the second and third zones were maintained at the intermediate temperature, the fourth zone was maintained at a preparation temperature and the fifth zone was maintained at the refractory temperature.

The aqueous stream was directed into the vaporization zone at a flow rate of 0.5 L/min and a pressure of 18 psi. A test aliquot was withdrawn from the aqueous stream after passage through the first condenser, at a temperature of 60° C.–65° C. The test aliquot was analyzed for ammonium persulfate, and less than 10 ppm ammonium persulfate were detected. Accordingly, a refractory temperature of 521° C. was sufficient to thermally decompose the ammonium persulfate.

Example 9

Partial Decomposition of Picric Acid

This Example illustrates the partial decomposition of picric acid at low temperatures, using the representative five-zone apparatus of FIG. 3. The refractory zone was the three-tube embodiment illustrated in FIGS. 7B and 7C. In this Example, the material was used as the aqueous stream without further modification.

Because of the potential for explosion if all of the picric acid is not at least partially decomposed before entering the refractory zone, test reactions were performed to evaluate the partial decomposition of picric acid at temperatures near the vaporization temperature. Accordingly, an aqueous test solution containing 10,000 ppm picric acid was prepared and treated at a series of zone temperatures. In each case, four liters of the aqueous stream was directed into the vaporization zone at a flow rate of 1 L/min and a head pressure of 8 psi.

In a first experiment, the first four zone temperatures were set as shown below:

| Zone | Temperature (°C.) |
| --- | --- |
| Vaporization | 98 |
| First intermediate | 91 |
| Second intermediate | 91 |
| Third intermediate | 97 |
| Refractory | na |

The fifth zone was not heated. The pressure at the exit of the first intermediate zone was 1.8 psi, the pressure at the exit of the third intermediate zone was 2.9 psi, and the pressure between the first and second condensers was approximately zero.

One test aliquot was withdrawn after the aqueous stream passed through the first intermediate zone and a second aliquot was withdrawn after the third intermediate zone. These aliquots were analyzed by GCMS method 8270A. After the first intermediate zone, most of the picric acid remained, although some 2,4-dinitrophenol was detected. However, less than 10 ppm picric acid remained after the third intermediate zone, and only trace levels of organic material remained. Accordingly, while treatment at 98° C. in the vaporization zone and 91° C. in the first intermediate zone is insufficient to significantly break down the picric acid, subsequent passage of the aqueous stream through the second and third intermediate zones, at 91° C. and 97° C., respectively, completed the decomposition of the picric acid. At these temperatures, the reaction was not significantly exothermic.

In a second experiment, the vaporization zone was maintained at 101° C., and test aliquots were again withdrawn after the first and third intermediate zones. The test aliquots were analyzed by GCMS method 8270A and similar results to those described above were obtained. Thus, while treatment at 101° C. is insufficient to significantly break down the picric acid, subsequent passage of the aqueous stream through the second and third intermediate zones, at 91° C. and 97° C., respectively, completed the decomposition of the picric acid. The increase in the vaporization zone temperature to 101° C. did not result in a significantly exothermic reaction.

In a third experiment, the first four zone temperatures were set as shown below:

| Zone | Temperature (°C.) |
| --- | --- |
| Vaporization | 101 |
| First intermediate | 99 |
| Second intermediate | 104 |
| Third intermediate | 116 |
| Refractory | na |

The fifth zone was not heated. Test aliquots were withdrawn after the aqueous stream passed through the first intermediate zone, and again after the stream passed through the third intermediate zone. These aliquots were analyzed by GCMS method 8270A. As in the earlier experiments, nearly all of the picric acid remained after treatment in the first intermediate zone and less than 10 ppm picric acid was detected after the aqueous stream passed through the third intermediate zone. The reaction was not significantly exothermic. Accordingly, a higher temperature in the third intermediate zone (116° C.) may be employed to decompose the picric acid without adverse reaction after treatment at the lower temperatures in the vaporization and first and second intermediate zones.

In a fourth experiment, the first four zone temperatures were set as shown below:

| Zone | Temperature (°C.) |
| --- | --- |
| Vaporization | 104 |
| First intermediate | 110 |
| Second intermediate | 110 |
| Third intermediate | 121 |
| Refractory | na |

The fifth zone was not heated. A test aliquot was withdrawn after the aqueous stream passed through the third intermediate zone and was analyzed by GCMS method 8270A. Less than 10 ppm picric acid was detected. However, although the refractory zone was not heated, the temperature in that zone rose dramatically (from 13° C. to 104° C. Within about 15 seconds) during treatment of the picric acid at these temperatures. Accordingly, the temperatures employed in the fourth experiment were too high to prevent adverse reactions during treatment of this material. These results indicate that the temperatures employed in the first three experiments are appropriate temperatures for partially decomposing picric acid prior to complete decomposition at an elevated refractory temperature, but the use of the temperatures employed in the fourth experiment would result in adverse reactions.

Example 10

Treatment of Chelated Nickel

This Example illustrates the treatment of nickel chelated with ethylene diamine acid (EDA), using the representative five-zone apparatus of FIG. 3. The refractory zone was the three-tube embodiment illustrated in FIGS. 7B and 7C. In this Example, the material was used as the aqueous stream without further modification.

Four liters of a test solution that contained 13 ppm chelated nickel was obtained from a commercial source. The solution also contained the following unchelated metals: 0.5 ppm Cd, 0.5 ppm Cu, 0.69 ppm Cr, 0.68 ppm Pb, 0.5 ppm Ag and 1.6 ppm Zn.

The vaporization temperature was set at 100° C., which was sufficient to vaporize most of the water in the aqueous stream. The refractory temperature was selected to be at the low end of the range normally sufficient for treatment of heavy metals. Accordingly, the refractory temperature was 149° C.

No intermediate temperatures were necessary because all of the DPCs could proceed directly from the vaporization temperature to the refractory temperature without adverse reaction. Accordingly, the first two intermediate zones of the apparatus were maintained at temperatures sufficient to preserve the vaporized state of the aqueous stream. The third intermediate zone was set to a slightly elevated preparation temperature to provide for increased efficiency of heating to the refractory temperature. Thus, the zone temperatures were set as follows:

| Zone | Temperature (°C.) |
| --- | --- |
| Vaporization | 100 |
| First intermediate | 96 |
| Second intermediate | 96 |
| Third intermediate | 110 |
| Refractory | 149 |

In other words, the apparatus was operated as a two zone system, where the first zone of the apparatus was maintained at the vaporization temperature, the second and third zones were not needed for treatment (and were therefore maintained at a temperature sufficient to maintain the vaporized state of the aqueous stream), the fourth zone was maintained at a slightly elevated preparation temperature, and the fifth zone was maintained at the refractory temperature.

The aqueous stream was directed into the vaporization zone at a flow rate of 1.0 L/min and a pressure of 8 psi. The pressure at the exit of the first intermediate zone was 1.24 psi, the pressure at the exit of the third intermediate zone was 2.05 psi, and the pressure between the first and second condensers was 0.08 psi.

A test aliquot was withdrawn from the aqueous stream after passage through the first condenser, at a temperature of 60° C.–65° C. The test aliquot was analyzed according to EPA Standard Method 3005, and was found to contain less than 0.08 ppm nickel. Accordingly, most of the nickel was deposited along the walls of the apparatus.

From the foregoing, it will be evident that although specific embodiments of the invention have been described herein for the purpose of illustrating the invention, various modifications may be made without deviating from the spirit and scope of the invention.

I claim:

1. A method for treating a material that contains at least one disposal problem component, comprising:

directing an aqueous stream comprising the material into an oxygen-deficient closed system, wherein water is present in the aqueous stream in an amount ranging from 75% to 99% by weight of the aqueous stream;

subjecting the aqueous stream to a vaporization temperature within the oxygen-deficient closed system, wherein the vaporization temperature ranges from 90°

C. to 150° C. and is sufficient to vaporize most of the water within the aqueous stream; and subsequently subjecting the aqueous stream to a refractory temperature within the oxygen-deficient closed system, wherein the refractory temperature ranges from 150° C. to 700° C. and is sufficient to thermally decompose or separate the disposal problem component such that the material is rendered more suitable for disposal.

2. The method of claim 1 wherein the vaporization temperature ranges from 95° C. to 130° C.

3. The method of claim 1 wherein the vaporization temperature ranges from 98° C. to 120° C.

4. The method of claim 1 wherein the vaporization temperature is sufficient to vaporize at least 90% of the water within the aqueous stream.

5. The method of claim 1 wherein the vaporization temperature is sufficient to vaporize at least 95% of the water within the aqueous stream.

6. The method of claim 1 wherein the refractory temperature ranges from 200° C. to 550° C.

7. The method of claim 1 wherein the refractory temperature ranges from 250° C. to 550° C.

8. The method of claim 1 wherein the amount of water in the aqueous stream ranges from 95% to 99% by weight of the aqueous stream.

9. The method of claim 1 wherein the aqueous stream is generated by introducing the material into a water stream.

10. The method of claim 1, further comprising cooling the aqueous stream after subjecting the aqueous stream to the refractory temperature.

11. The method of claim 1 wherein the material is a hazardous material.

12. The method of claim 11 wherein the hazardous material comprises an organic compound.

13. The method of claim 11 wherein the hazardous material comprises a radioisotope.

14. The method of claim 1 wherein the material comprises a mixture of at least two disposal problem components.

15. The method of claim 1 further comprising subjecting the aqueous stream in the oxygen-deficient closed system to a first intermediate temperature which ranges from 90° C. to 700° C. and which is less than the refractory temperature, wherein the aqueous stream is subjected to the first intermediate temperature after being subjected to the vaporization temperature and before being subjected to the refractory temperature.

16. The method of claim 15 wherein the first intermediate temperature maintains the aqueous stream in a wet steam condition.

17. The method of claim 16, further comprising subjecting the aqueous stream in the oxygen-deficient closed system to a second intermediate temperature greater than the first intermediate temperature and less than the refractory temperature, wherein the aqueous stream is subjected to the second intermediate temperature after being subjected to the first intermediate temperature and before being subjected to the refractory temperature.

18. The method of claim 17 wherein the second intermediate temperature maintains the aqueous stream in a wet steam condition.

19. The method of claim 18, further comprising subjecting the aqueous stream in the oxygen-deficient closed system to a third intermediate temperature greater than the second intermediate temperature and less than the refractory temperature, wherein the aqueous stream is subjected to the third intermediate temperature after being subjected to the second intermediate temperature and before being subjected to the refractory temperature.

20. A method for treating a chelated metal to yield a metal and a chelating ligand, comprising directing an aqueous stream comprising the chelated metal into an oxygen-deficient closed system, wherein water is present in the aqueous stream in an amount greater than 50% by weight of the aqueous stream;

subjecting the aqueous stream to a vaporization temperature within the oxygen-deficient closed system, wherein the vaporization temperature ranges from 90° C. to 150° C. and is sufficient to vaporize most of the water within the aqueous stream; and subsequently subjecting the aqueous stream to a refractory temperature within the oxygen-deficient closed system, wherein the refractory temperature ranges from 150° C. to 700° C. and is sufficient to separate the metal from the chelating ligand.

21. The method of claim 20 wherein the metal is radioactive.

22. An apparatus for treating a material which contains at least one disposal problem component, comprising:

an oxygen-deficient closed system comprising a vaporization zone and a refractory zone downstream from and in fluid communication with the vaporization zone, wherein the vaporization zone is capable of being maintained at a temperature ranging from 90° C. to 150° C. which is sufficient to vaporize most of the water within an aqueous stream comprising the material, and wherein the refractory zone is capable of being maintained at a temperature ranging from 150° C. to 700° C. which is sufficient to thermally decompose or separate the disposal problem component such that the material is rendered more suitable for disposal;

an inlet upstream from, and in fluid communication with, the vaporization zone, wherein the inlet comprises an injection port, and wherein the material passes through the injection port prior to forming the aqueous stream; and an outlet downstream from, and in fluid communication with, the refractory zone.

23. The apparatus of claim 22 wherein the oxygen-deficient closed system further comprises a first intermediate zone downstream from the vaporization zone and upstream from the refractory zone, wherein the first intermediate zone is capable of being maintained at a temperature ranging from 90° C. to 700° C. which is less than the temperature of the refractory zone.

24. The apparatus of claim 23 wherein the closed system further comprises a second intermediate zone downstream from the first intermediate zone and upstream from the refractory zone, wherein the second intermediate zone is capable of being maintained at a temperature greater than or equal to the temperature of the first intermediate zone and less than the temperature of the refractory zone.

25. The apparatus of claim 24 wherein the closed system further comprises a third intermediate zone downstream from the second intermediate zone and upstream from the refractory zone, wherein the third intermediate zone is capable of being maintained at a temperature greater than or equal to the temperature of the second intermediate zone and less than the temperature of the refractory zone.

26. The apparatus of claim 22 further comprising a condenser downstream from, and in fluid communication with, the outlet.

27. An apparatus for treating a material in the form of an aqueous stream which contains at least one disposal problem component, comprising:

means for subjecting the aqueous stream to a vaporization temperature in an oxygen-deficient environment, wherein the vaporization temperature ranges from 90° C. to 150° C. and is sufficient to vaporize most of the water within the aqueous stream;

means for subsequently subjecting the aqueous stream to a refractory temperature in an oxygen-deficient environment, wherein the refractory temperature ranges from 150° C. to 700° C. and is sufficient to thermally decompose or separate the disposal problem component such that the material is rendered more suitable for disposal;

means for individually controlling the vaporization temperature and the refractory temperature; and means for controlling the flow rate of the aqueous stream through the apparatus.

28. The apparatus of claim 27, further comprising:

means for subjecting the aqueous stream to a first intermediate temperature in an oxygen-deficient environment, wherein the first intermediate temperature is greater than 90° C. and less than the refractory temperature.

29. The apparatus of claim 28, further comprising:

means for subjecting the aqueous stream to a second intermediate temperature in an oxygen-deficient environment, wherein the second intermediate temperature is greater than the first intermediate temperature and less than the refractory temperature.

30. The apparatus of claim 29, further comprising:

means for subjecting the aqueous stream to a third intermediate temperature in an oxygen-deficient environment, wherein the third intermediate temperature is greater than the second intermediate temperature and less than the refractory temperature.

31. The apparatus of claim 27, further comprising:

means for condensing the aqueous stream after the aqueous stream is subjected to the refractory temperature.

32. The apparatus of claim 31, wherein the condensing means comprises multiple condensers maintained at successively lower temperatures.

33. The apparatus of claim 32, wherein a tap is provided between two adjacent condensers to permit withdrawal of a test aliquot of the aqueous stream.

34. The apparatus of claim 27 wherein the means for controlling the flow rate of the aqueous stream through the apparatus is a metered pump.

35. A method for treating a material that contains at least one disposal problem component, comprising:

directing an aqueous stream comprising the material into an oxygen-deficient closed system, wherein water is present in the aqueous stream in an amount greater than 200% of the stoichiometric amount by weight of the aqueous stream;

subjecting the aqueous stream to a vaporization temperature within the oxygen-deficient closed system, wherein the vaporization temperature ranges from 90° C. to 150° C. and is sufficient to vaporize most of the water within the aqueous stream; and subsequently subjecting the aqueous stream to a refractory temperature within the oxygen-deficient closed system, wherein the refractory temperature ranges from 150° C. to 700° C. and is sufficient to thermally decompose or separate the disposal problem component such that the material is rendered more suitable for disposal.

36. The method of claim 35 wherein the vaporization temperature ranges from 95° C. to 130° C.

37. The method of claim 35 wherein the vaporization temperature ranges from 98° C. to 120° C.

38. The method of claims 35 wherein the vaporization is sufficient to vaporize at least 90% of the water within the aqueous stream.

39. The method of claim 35 wherein the vaporization temperature is sufficient to vaporize at least 95% of the water within the aqueous stream.

40. The method of claim 35 wherein the refractory temperature ranges from 200° C. to 550° C.

41. The method of claim 35 wherein the refractory temperature ranges from 250° C. to 550° C.

42. The method of claim 35 wherein water is present in the aqueous stream in an amount greater than 300% of the stoichiometric amount.

43. The method of claim 35 wherein the aqueous stream is generated by introducing the material into a water stream.

44. The method of claim 35, further comprising cooling the aqueous stream after subjecting the aqueous stream to the refractory temperature.

45. The method of claim 35 wherein the material is a hazardous material.

46. The method of claim 45 wherein the hazardous material comprises an organic compound.

47. The method of claim 45 wherein the hazardous material comprises a radioisotope.

48. The method of claim 35 wherein the material comprises a mixture of at least two disposal problem components.

49. The method of claim 35, further comprising subjecting the aqueous stream in the oxygen-deficient closed system to a first intermediate temperature which ranges from 90° C. to 700° C. and which is less than the refractory temperature, wherein the aqueous stream is subjected to the first intermediate temperature after being subjected to the vaporization temperature and before being subjected to the refractory temperature.

50. The method of claim 49 wherein the first intermediate temperature maintains the aqueous stream in a wet steam condition.

51. The method of claim 50, further comprising subjecting the aqueous stream in the oxygen-deficient closed system to a second intermediate temperature greater than the first intermediate temperature and less than the refractory temperature, wherein the aqueous stream is subjected to the second intermediate temperature after being subjected to the first intermediate temperature and before being subjected to the refractory temperature.

52. The method of claim 51 wherein the second intermediate temperature maintains the aqueous stream in a west steam condition.

53. The method of claim 52, further comprising subjecting the aqueous stream in the oxygen-deficient closed system to a third intermediate temperature greater than the second intermediate temperature and less than the refractory temperature, wherein the aqueous stream is subjected to the third intermediate temperature after being subjected to the second intermediate temperature and before being subjected to the refractory temperature.

* * * * *